United States Patent
Shimahashi et al.

(10) Patent No.: US 9,747,715 B2
(45) Date of Patent: Aug. 29, 2017

(54) IMAGE PROCESSING APPARATUS FOR GENERATING COMBINED IMAGE DATA BY DETERMINING REFERENCE REGION

(71) Applicant: BROTHER KOGYO KABUSHIKI KAISHA, Nagoya, Aichi (JP)

(72) Inventors: Takuya Shimahashi, Nagoya (JP); Tomohiko Hasegawa, Okazaki (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 76 days.

(21) Appl. No.: 14/664,994

(22) Filed: Mar. 23, 2015

(65) Prior Publication Data
US 2015/0278637 A1    Oct. 1, 2015

(30) Foreign Application Priority Data
Mar. 31, 2014 (JP) ................ 2014-073949

(51) Int. Cl.
| | | |
|---|---|---|
| G06K 9/00 | (2006.01) | |
| G06T 11/60 | (2006.01) | |
| G06K 9/20 | (2006.01) | |
| H04N 1/00 | (2006.01) | |
| G06T 3/40 | (2006.01) | |

(52) U.S. Cl.
CPC ......... *G06T 11/60* (2013.01); *G06K 9/00476* (2013.01); *G06K 9/20* (2013.01); *G06T 3/4038* (2013.01); *H04N 1/00* (2013.01); *G06K 2009/2045* (2013.01)

(58) Field of Classification Search
None
See application file for complete search history.

(56) References Cited

U.S. PATENT DOCUMENTS

| | | | |
|---|---|---|---|
| 5,465,163 A | 11/1995 | Yoshihara et al. | |
| 6,215,914 B1 * | 4/2001 | Nakamura | H04N 1/3876 348/584 |
| 7,076,116 B2 * | 7/2006 | Horie | G06T 7/0024 358/450 |

(Continued)

FOREIGN PATENT DOCUMENTS

| | | |
|---|---|---|
| JP | S61-204716 A | 9/1986 |
| JP | H04-290066 A | 10/1992 |

(Continued)

OTHER PUBLICATIONS

Office Action dated Feb. 14, 2017 from related Japanese Patent Application No. 2014-073949 with Partial English Translation.

*Primary Examiner* — Hadi Akhavannik
(74) *Attorney, Agent, or Firm* — Scully, Scott, Murphy & Presser, PC

(57) ABSTRACT

An image processing apparatus performs: determining a reference region that is a part region of a first image; calculating, for at least one of candidate regions, a degree of similarity between the reference region and each of the at least one candidate regions; identifying a corresponding region from among the plurality of candidate regions based on at least one degree of similarity; and generating combined image data by using the first image data and the second image data. The combined image data represents a combined image in which the first image is combined with the second image by overlapping the reference region with the identified corresponding region.

18 Claims, 15 Drawing Sheets

(56) References Cited

U.S. PATENT DOCUMENTS

2006/0245011 A1* 11/2006 Chen .................. H04N 1/1013
                                                                  358/474

FOREIGN PATENT DOCUMENTS

| | | |
|---|---|---|
| JP | 2001-325588 A | 11/2001 |
| JP | 2003-023530 A | 1/2003 |
| JP | 2003310586 A | 11/2003 |
| JP | 2009136421 A | 6/2009 |

* cited by examiner

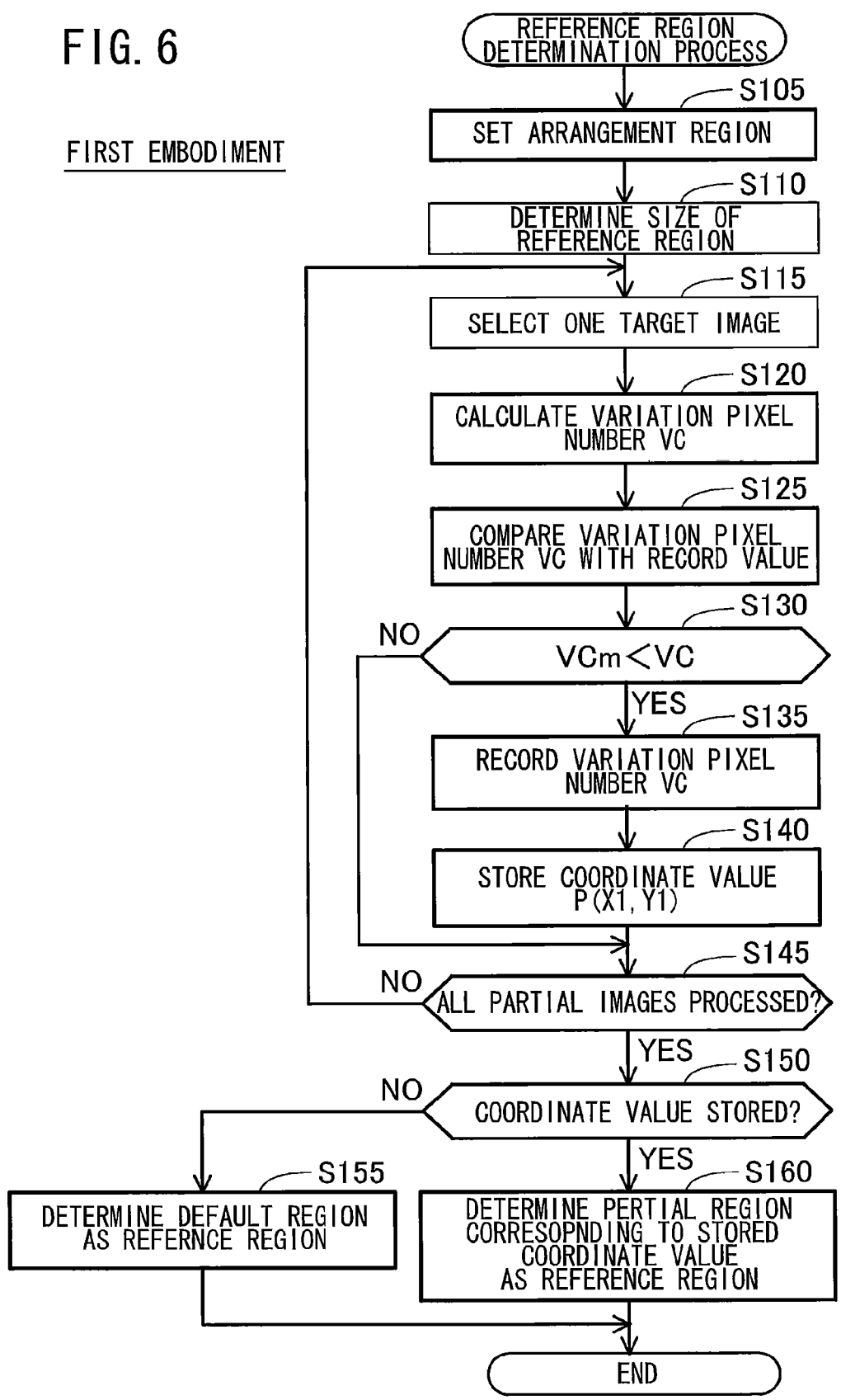

$$V = \sum_{n=1}^{8} (\Delta Vn)$$

$$\Delta Vn = (|Rn-R0| + |Gn-G0| + |Bn-B0|)$$

SECOND EMBODIMENT

IMAGE PROCESSING APPARATUS FOR GENERATING COMBINED IMAGE DATA BY DETERMINING REFERENCE REGION

CROSS REFERENCE TO RELATED APPLICATION

This application claims priority from Japanese Patent Application No. 2014-073949 filed Mar. 31, 2014. The entire content of the priority application is incorporated herein by reference.

The present invention relates to technology for generating combined image data representing an image obtained by joining a first image and a second image.

BACKGROUND

There is disclosed technology for generating combined image data representing an image obtained by joining a first image and a second image. For example, when a document has a size that cannot be read in a single scanning operation, the document is scanned in two scanning operations, thereby acquiring scan data representing the first image and scan data representing the second image. Then, the two scan data are used to generate output image data representing an image obtained by joining the first and second images. In this case, a pattern matching is used to determine a position at which the first and second images are joined.

SUMMARY

However, in the above technology, always the first and second images are joined by the same image process. That is, the simple image process cannot join the first and second images appropriately.

An object of the present invention is to provide technology capable of properly combining the first and second images in generating combined image data.

In order to attain the above and other objects, the invention provides an image processing apparatus. The image processing apparatus may include a processor and a memory. The processor may include hardware. The memory may store computer-readable instructions therein. The computer-readable instructions, when executed by the processor, may cause the image processing apparatus to perform: acquiring a first image data representing a first image having a plurality of pixels and a second image data representing a second image, each of the plurality of pixels having a pixel value; determining a reference region that is a part region of the first image; calculating, for at least one of candidate regions among a plurality of candidate regions in the second image, a degree of similarity between the reference region and each of the at least one candidate regions; identifying a corresponding region from among the plurality of candidate regions based on at least one degree of similarity; and generating combined image data by using the first image data and the second image data, the combined image data representing a combined image in which the first image is combined with the second image by overlapping the reference region with the identified corresponding region. A size of the reference region may be determined based on a variation in the pixel value among the plurality of pixels in the first image data.

According to another aspect, the present invention provides an image processing apparatus. The image processing apparatus may include a processor and a memory. The processor may include hardware. The memory may store computer-readable instructions therein. The computer-readable instructions, when executed by the processor, may cause the image processing apparatus to perform: acquiring a first image data representing a first image having pixels and a second image data representing a second image, the first image data having pixel values corresponding to the pixels; determining a reference region that is a part region of the first image; calculating, for at least one candidate region among a plurality of candidate regions in the second image, a degree of similarity between the reference region and each of the at least one candidate region; identifying a corresponding region from among the plurality of candidate regions based on at least one degree of similarity; and generating combined image data by using the first image data and the second image data, the combined image data representing a combined image in which the first image is combined with the second image by overlapping the reference region with the identified corresponding region. The determining the reference region may include: calculating a variation value indicating a variation in the pixel value among pixels in each of a plurality of partial images from the first image. The reference region may be determined to be a partial image that has a largest variation value from among the plurality of partial images.

According to another aspect, the present invention provides an image processing apparatus. The image processing apparatus may include a processor and a memory. The processor may include hardware. The memory may store computer-readable instructions therein. The computer-readable instructions, when executed by the processor, may cause the image processing device to perform: acquiring a first image data representing a first image having pixels and a second image data representing a second image, the first image data having pixel values corresponding to the pixels; determining a reference region that is a part region of the first image; calculating, for at least one of candidate region among a plurality of candidate regions in the second image, a degree of similarity between the reference region and one of the at least one candidate regions; identifying a corresponding region from among the plurality of candidate regions based on at least one degree of similarity; and generating combined image data by using the first image data and the second image data, the combined image data representing a combined image in which the first image is combined with the second image by overlapping the reference region with the identified corresponding region. A shape of the reference region may be determined based on a variation in the pixel value among the plurality of pixels in the first image data.

According to another aspect, the present invention provides an image processing apparatus. The image processing apparatus may include a processor and a memory. The processor may include hardware. The memory may store computer-readable instructions therein. The computer-readable instructions, when executed by the processor, may cause the image processing device to perform: acquiring a first image data representing a first image having pixels and a second image data representing a second image, the first image data having pixel values corresponding to the pixels; determining a first reference region that is a part region of the first image; determining a second reference region within the first image by modifying number of pixels in the first reference region; calculating, for at least one of candidate region among a plurality of candidate regions in the second image, a degree of similarity between the second reference region and each of the at least one candidate regions; identifying a corresponding region from among the plurality of candidate regions based on at least one degree of similarity; and generating combined image data by using the first image data and the second image data, the combined image data representing a combined image in which the first image is combined with the second image by overlapping the second reference region with the identified corresponding region.

BRIEF DESCRIPTION OF THE DRAWINGS

The particular features and advantages of the invention as well as other objects will become apparent from the following description taken in connection with the accompanying drawings, in which:

FIG. 6 is a flowchart illustrating a reference region determination process according to the first embodiment;

DETAILED DESCRIPTION

A. First Embodiment

A-1. Configuration of Image Processing System 1000

Figure 1:
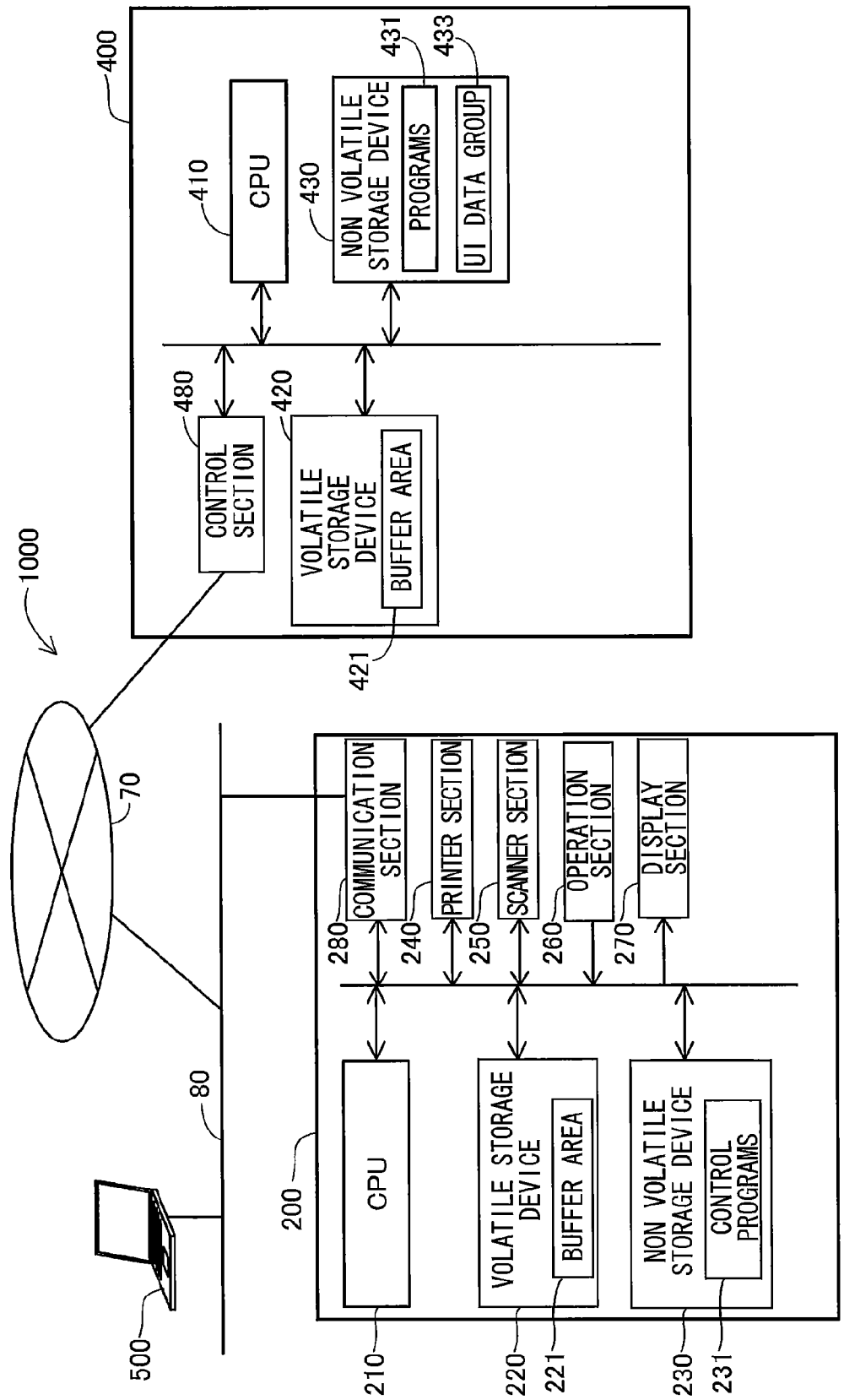
FIG. 1 is a block diagram illustrating a configuration of an image processing system according to a first embodiment.

FIG. 1 is a block diagram illustrating a configuration of an image processing system in a first embodiment. An image processing system 1000 includes a server 400 serving as an image processing apparatus and a multifunction peripheral 200. The server 400 is connected to Internet 70, and the multifunction peripheral 200 is connected to the Internet 70 through a LAN (Local Area Network) 80. The server 400 and the multifunction peripheral 200 are communicable with each other through the LAN 80 and the Internet 70. Further, the LAN 80 is connected with a personal computer 500 of a user who also operates the multifunction peripheral 200.

The server 400 includes a CPU 410, a volatile storage device 420 such as a DRAM, a non-volatile storage device 430 such as a hard disk drive or a flash memory, and a communication section 480 including an interface for connecting to a network such as the Internet 70. The volatile storage device 420 has a buffer area 421 for temporarily storing various intermediate data generated when the CPU 410 performs processes. The non-volatile storage device 430 stores computer programs 431 and a UI data group 433.

The computer programs 431 and the UI data group 433 are uploaded to the server 400 through the Internet 70 by an administrator of the server 400, for example, thereby being installed on the server 400. Alternatively, the computer programs 431 and the UI data group 433 may be stored in a DVD-ROM, for example, and are installed to the server 400 by the administrator of the server 400. The CPU 410 executes at least one of the computer programs 431, thereby realizing an image process to be described later.

The multifunction peripheral 200 includes a CPU 210, a volatile storage device 220 such as a DRAM, a non-volatile storage device 230 such as a hard disk drive or a flash memory, and a printer section 240, a scanner section 250, an operation section 260 such as a touch panel or a button, a display section 270 such as a liquid crystal display, and a communication section 280 for communicating with an external device. The communication section 280 includes an interface for connecting to a network such as the LAN 80 or an interface for connecting to an external storage device such as a USB memory, for example.

The volatile storage device 220 has a buffer area 221 for temporarily storing various data generated when the CPU 210 performs processes. The non-volatile storage device 230 stores control programs 231.

The printer section 240 executes a printing operation using a printing system such as an inkjet system or a laser system. The scanner section 250 generates scan data by optically reading a document using a photoelectric conversion element (for example, a CCD (Charge Coupled Device) image sensor or a CMOS (Complementary Metal Oxide Semiconductor) image sensor). The scanner section 250 has so-called a flat-bet type platen. In the present embodiment, the maximum size of the document that can be read by a single scan operation is larger than A4 and smaller than A3. Specifically, the scanner section 250 can read a document whose longitudinal size is the same as the size of A4 and short-side size is slightly larger than the size of A4 (by a few centimeters, for example). Thus, as described later, an A3-size document can be divided into two images by performing two reading operations such that both of the two images has an overlap image representing a center portion of the A3-size document.

The CPU 210 executes at least one of the control programs 231 for controlling the multifunction peripheral 200. For example, the CPU 210 executes a copy process, a print process, or a scan process by controlling the printer section 240 or the scanner section 250. Further, the CPU 210 accesses the server 400 and executes a service using process that uses services provided by the server 400.

A-2: Operation of Image Processing System 1000

Figure 2:
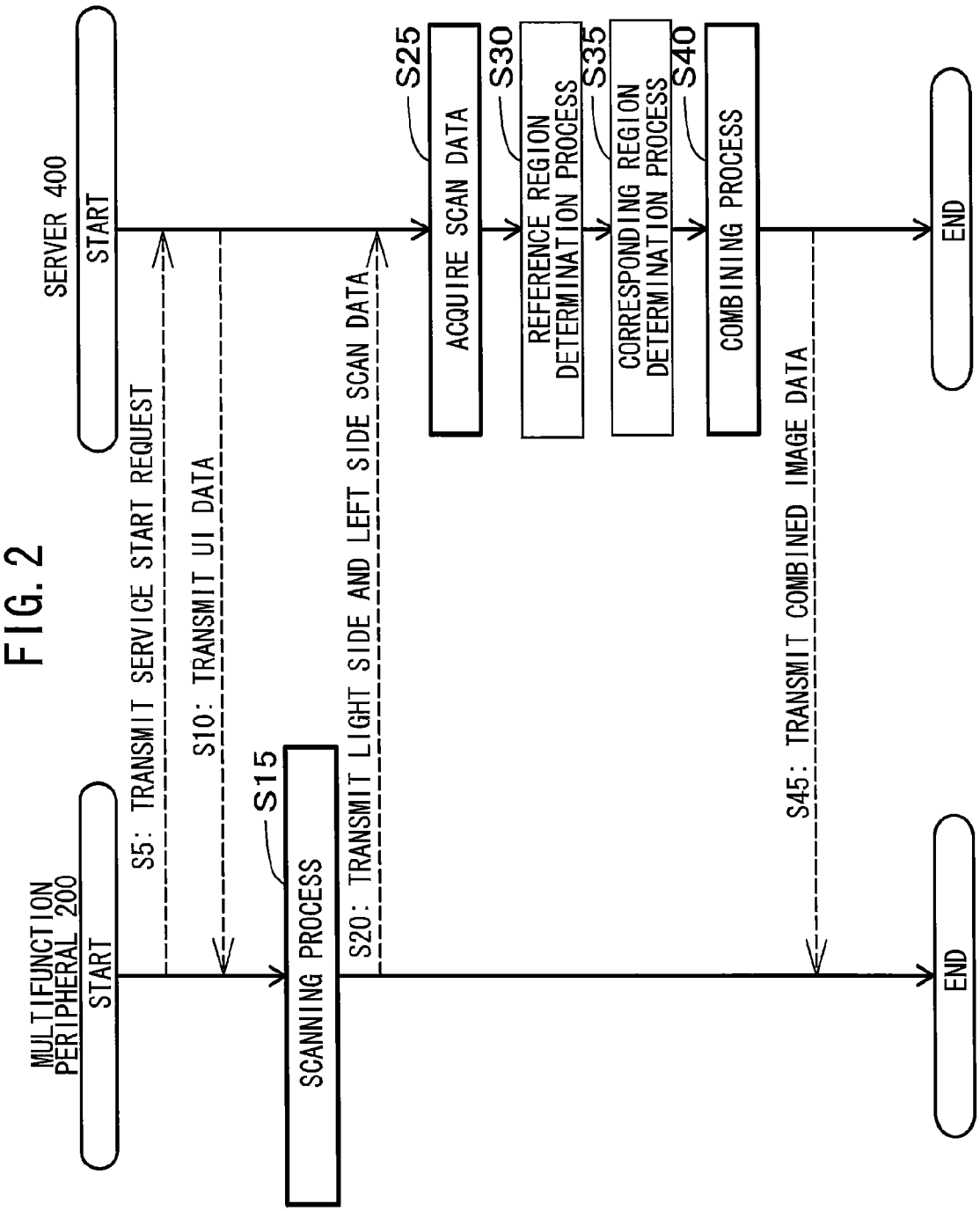
FIG. 2 is a flowchart illustrating operations of the image processing system.

FIG. 2 is a flowchart illustrating operations of the image processing system 1000. The process shown in FIG. 2 is started when the multifunction peripheral 200 receives, from a user, an instruction to use an image generation service provided by the server 400. Although details will be described later, when a document has a size larger than a size that can be read by a single scanning operation, the plurality of sets of scan data is generated by a plurality of scanning operations. As described later in detail, when a document has a size larger than a size that can be read by a single scanning operation, the plurality of sets of scan data is generated by a plurality of scanning operations. The image generation service combines a plurality of scan images represented by the plurality of sets of scan data.

In S5, the CPU 210 of the multifunction peripheral 200 transmits a service start request to the server 400. Upon receiving the service start request, in S10 the CPU 410 of the server 400 selects UI data necessary for providing the image generation service from the UI data group 433 (FIG. 1) and transmits the selected UI data to the multifunction peripheral 200. Specifically, the UI data includes screen data representing a user interface screen (hereinafter, referred to as a UI screen) and control data. For example, the control data includes various data that is required if the multifunction peripheral 200 performs predetermined processes (specifically, a scanning process of S15 to be described later) using the UI screen. Further, the control data includes information, such as a transmission destination address of scan data, which is required if the multifunction peripheral 200 performs processes (for example, a process for transmitting scan data to the server 400) in response to a user instruction received through the UI screen (FIG. 4).

In S15, the CPU 210 executes the scanning process to generate a plurality of scan data on the basis of the received UI data. In the scanning process, the CPU 210 performs two scanning operations to read a document prepared by the user, thereby generating two sets of scan data. The scan data in the present embodiment is RGB image data including RGB component values for each pixel. Each of RGB component values has one of 256-gradation values ranging from 0 to 255.

Figure 3:
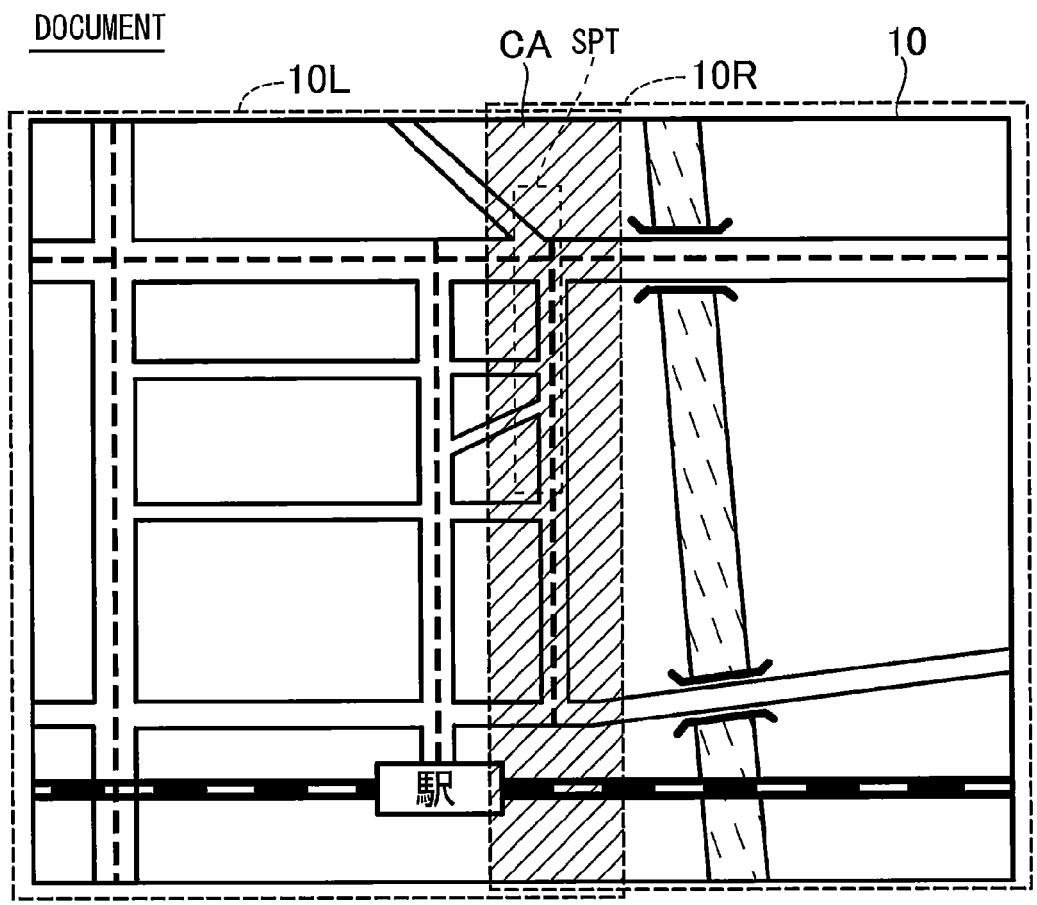
FIG. 3 is an example of a document used in the first embodiment.

FIG. 3 is an example of a document used in the embodiment. A document 10 of FIG. 3 has a size (the A3 size, for example) about two times larger than a size (slightly larger than the A4 size in the present embodiment) that can be read in a single scanning operation by the scanner section 250.

Figure 4:
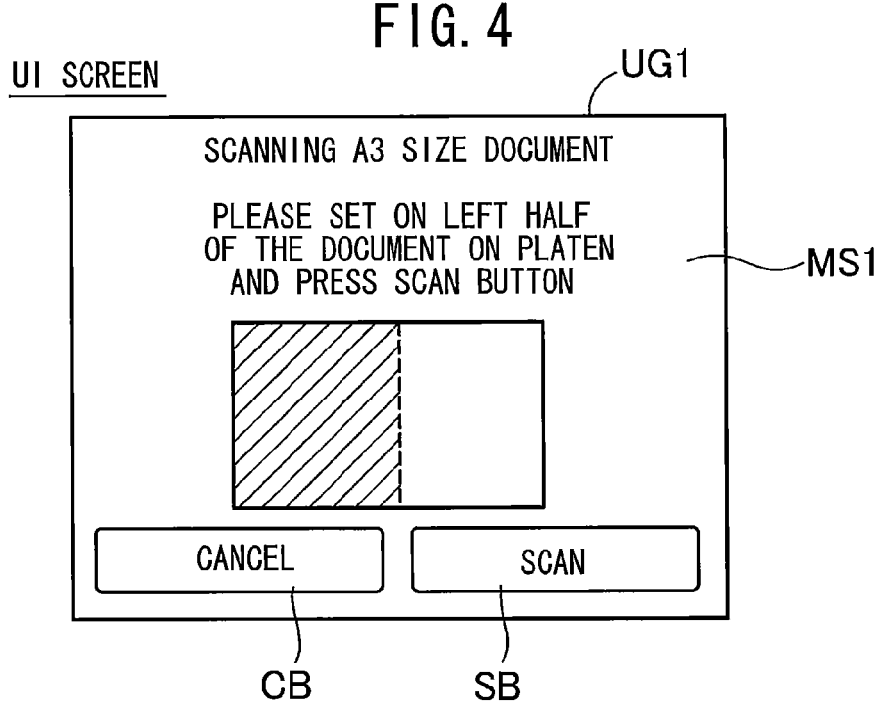
FIG. 4 is an example of a UI screen according to the first embodiment.

FIG. 4 is an example of the UI screen. The CPU 210 displays a UI screen UG1 of FIG. 4 on the display section 270. For example, the UI screen UG1 includes a message MS1 that prompts the user to appropriately place the document 10 on the platen, a scan button SB, and a cancel button CB. The user places the document 10 on the platen such that a half region 10L (FIG. 3) of the document 10 on a left side can be read. Subsequently, the user presses down the scan button SB. In response to the press-down of the scan button SB, the CPU 210 controls the scanner section 250 to read the document and generate left-side scan data.

Figure 5B:
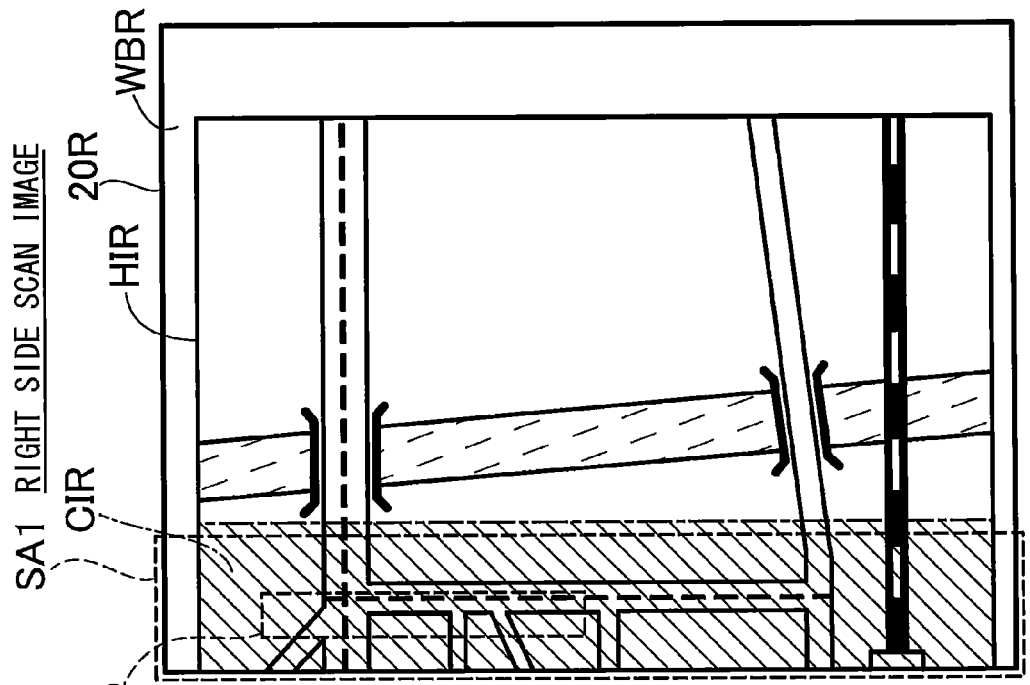
FIG. 5B is an example of a right-side scan image according to the first embodiment.
Figure 5A:
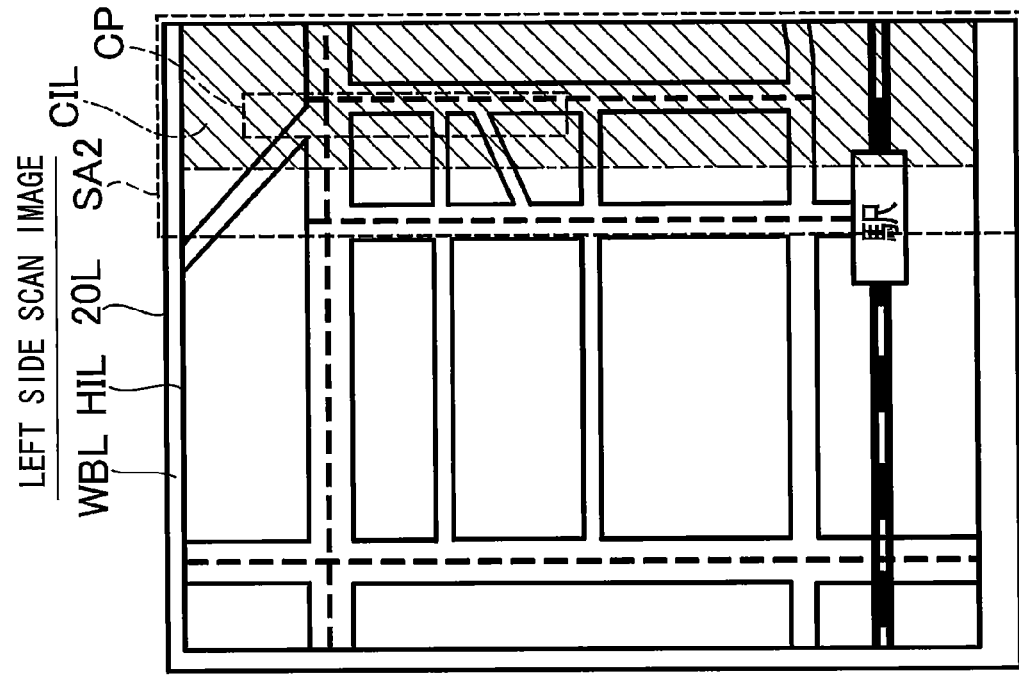
FIG. 5A is an example of a left-side scan image according to the first embodiment.

FIGS. 5A and 5B are examples of scan images. FIG. 5A shows a left-side scan image 20L represented by the left-side scan data. The left-side scan image 20L includes a margin WBL and a left-side document image HIL representing the left-side half region 10L (FIG. 3) of the document 10.

The CPU 210 displays a prescribed UI screen (not illustrated) on the display section 270. Similarly to the UI screen UG1, the UI screen displayed at this time includes the message that prompts the user to appropriately place the document 10 on the platen, a scan button, and a cancel button. The user places the document 10 on the platen such that a half region 1 OR (FIG. 3) of the document 10 on a right side can be read. Subsequently, the user presses down the scan button. In response to the press-down of the scan button, the CPU 210 controls the scanner section 250 to read the document and generate right-side scan data.

FIG. 5B shows a right-side scan image 20R represented by the right-side scan data. The right-side scan image 20R includes a margin WBR and a right-side document image HIR representing the right-side half region 10R (FIG. 3) of the document 10.

Both the left-side scan image 20L and the right-side scan image 20R includes a center image representing a center portion CA (FIG. 3) of the document 10 in a horizontal direction. Specifically, a region along a right side (right end) of the left-side scan image 20L and a region along a left side (left end) of the right-side scan image 20R includes the center image. That is, as illustrated by hatching in FIGS. 5A and 5B, the left-side scan image 20L includes an image CIL representing the center portion CA of the document 10, and the right-side scan image 20R includes an image CIR representing the center portion CA of the document 10. This is realized, for example, by instructing the user through the UI screen or an operation manual to place the document 10 on the platen so as to allow the center portion CA of the document 10 to be read both when the right-side scan data is generated and when the left-side scan data is generated. Although both the image CIL within the left-side scan image 20L and the image CIR within the right-side scan image 20R represent the portion CA of the document 10, a slight difference can occur in size (area) or color between the images CIL and CIR, depending on user operation, for example.

In S20 of FIG. 2, the CPU 210 transmits the right-side scan data representing the right-side scan image 20R and the left-side scan data representing the left-side scan image 20L to the server 400. In S25, the CPU 410 of the server 400 acquires the right-side scan data and the left-side scan data and stores them in the buffer area 421.

In S30, the CPU 410 uses the right-side scan data to execute a reference region determination process. The reference region determination process determines a reference region SP which is a partial region of the right-side scan image 20R represented by the right-side scan data.

FIG. 6 is a flowchart illustrating the reference region determination process. In S105, the CPU 410 sets an arrangement region SA1 within the right-side scan image 20R. The reference region SP is set inside the set arrangement region SA1 in the reference region determination process. A position, a shape, and a size (for example, the number of pixels in both the vertical and horizontal directions) of the arrangement region SA1 are previously determined.

Specifically, as illustrated in FIG. 5B, the arrangement region SA1 is arranged along a side (an end) included in the image CIR representing the center portion CA of the document 10 among the four sides (four ends) of the right-side scan image 20R. That is, in the embodiment, the arrangement region SA1 is arranged along the left end of the right-side scan image 20R.

A length of the arrangement region SA1 in the horizontal direction (that is, a short-side direction) is preferably smaller than a horizontal width of the image CIR representing the center portion CA of the document 10 in the right-side scan image 20R. The length of the arrangement region SA1 in the horizontal direction is about 30 pixels to about 200 pixels, for example. In the other words, the length of the arrangement region SA1 in the horizontal direction is about 1% to 5% of a length of the right-side scan image 20R in the horizontal direction.

A length of the arrangement region SA1 in a vertical direction (that is, a longitudinal direction) thereof is equal to a length of the right-side scan image 20R in the vertical direction. The aspect ratio of the arrangement region SA1 shown in FIG. 5B is different from the aspect ratio of the actual arrangement region SA1. Specifically, the size of the actual arrangement region SA1 in the vertical direction is larger than the size of the arrangement region SA1 shown in FIG. 5B.

In the present embodiment, the arrangement region SA1 includes the left end of the right-side scan image 20R, a left side portion of a top end of the right-side scan image 20R, and a left side portion of a bottom end of the right-side scan image 20R. Alternatively, the arrangement region SA1 may be not include the left, top, and bottom ends of the right-side scan image R and disposed with a prescribed gap (gap corresponding to 20 pixels, for example) from each of the left, top, and bottom ends. A shadow of an end portion of the document may be read so that the end portion of the scan image 20R has larger amount of noise than an inner portion. Because the arrangement region SA1 is set with a gap from the left, top, and bottom ends of the right-side scan image 20R in this case, a region including a larger amount of noise can be prevented from being included in the reference region.

In S110, the CPU 410 determines the size of the reference region SP. In the present embodiment, the size of the reference region SP is set to a predetermined value. For example, the size of the reference region SP in the horizontal direction thereof is 5 pixels to about 20 pixels. The size of the reference region SP in the vertical direction is about ¼ to about ½ of the number of pixels arranged in the vertical direction of the right-side scan image 20R.

Figures 7, 8:
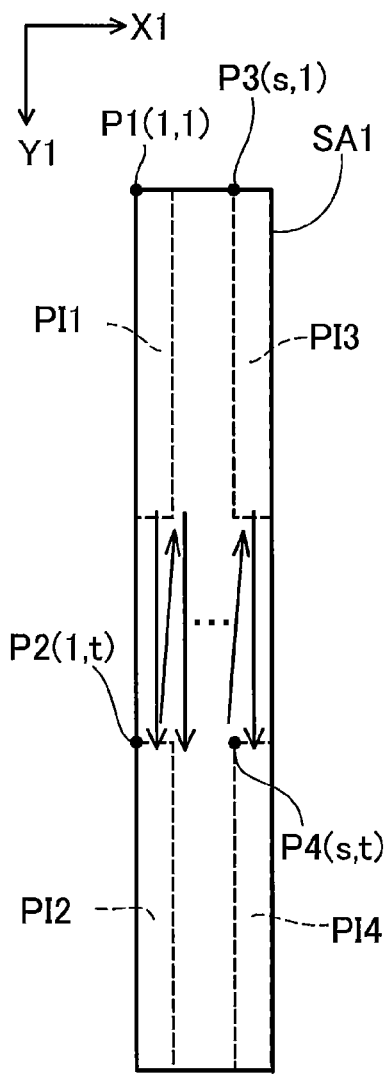
FIG. 7 is an explanatory diagram illustrating a plurality of partial images in an arrangement region according to the first embodiment.
FIG. 8 is an explanatory diagram illustrating a variation pixel and a non-variation pixel according to the first embodiment.

In S115, the CPU 410 selects one target partial image from a plurality of partial images in the arrangement region SA1. FIG. 7 illustrates the plurality of partial images in the arrangement region SA1. In FIG. 7, a position of a pixel in the arrangement region SA1 is represented by using a two-dimensional coordinate system having an X1 axis whose positive direction is rightward and a Y1 axis whose positive direction is downward. In this coordinate system, the coordinate value (1, 1) indicates an uppermost-leftmost pixel in the arrangement region SA1.

A size and a shape of the partial image are the same as those of the reference region SP set in S110.

As shown in FIG. 7, the plurality of partial images includes partial images PI1, PI2, PI3, and PI4. An top end and a left end of the partial image PI1 respectively coincide with the top end and the left end of the arrangement region SA1. The partial image PI1 includes an uppermost-leftmost pixel P1 among pixels therein. The coordinate value of the pixel P1 is (1, 1). A bottom end and an left end of the partial image PI2 respectively coincide with the bottom end and the left end of the arrangement region SA1. The partial image PI2 includes an uppermost-leftmost pixel P2 among pixels therein. The coordinate value of the pixel P2 is (1, t). Here, t is a natural number. A top end and an right end of the partial image PI3 respectively coincide with the top end and the right end of the arrangement region SA1. The partial image PI3 includes an uppermost-leftmost pixel P3 among pixels therein. The coordinate value of the pixel P3 is (s, 1). Here, s is a natural number. A bottom end and an right end of the partial image PI4 respectively coincide with the bottom end and the right end of the arrangement region SA1. The partial image PI4 includes an uppermost-leftmost pixel P4 among pixels therein. The coordinate value of the pixel P4 is (s, t). As described above, a representative pixel of a partial image is an uppermost-leftmost pixel of the partial image.

A target partial image is selected from (s×t) partial images whose uppermost-leftmost pixel is positioned at a coordinate value (a, b). Here, a is an arbitrary integer equal to or more than 1 and equal to or less than s, and b is an arbitrary integer equal to or more than 1 and equal to or less than t.

An order in which the CPU 410 selects the partial image will be explained. As indicated by arrows in FIG. 7, the CPU 410 selects the partial image PH at the upper-left end as a first target partial image from the (s×t) partial images. Subsequently, the CPU 410 selects sequentially partial images while shifting a position of pixel downward one by one. Then, after the CPU 410 selects the partial image PI2 at the lowest left end, the CPU 410 selects a partial image shifted rightward from the partial image PH by one pixel. That is, when the lowermost partial image is currently selected, the CPU 410 selects, as a next partial image, an uppermost partial image that is shifted rightward from the currently selected lowermost partial image by one pixel. Subsequently, the CPU 410 selects sequentially partial images while shifting a position of the pixel downward one by one. By repeating the selection of the partial images as described above, finally, the CPU 410 selects the partial image P14 at the lower-right end.

When one target partial image is selected, in S120 the CPU 410 calculates a variation pixel number VC for the target partial image.

A method of calculating the variation pixel number VC is as follows. The CPU 410 classifies a plurality of pixels in the target partial image into two pixel type. One pixel type is a variation pixel and another pixel group is a non-variation pixel.

FIG. 8 is an explanation diagram illustrating the variation pixel and the non-variation pixel. The CPU 410 selects each of the plurality of pixels in the target partial image one by one as a target pixel TP. The CPU 410 determines whether the target pixel TP is the variation pixel or the non-variation pixel. Specifically, as shown in FIG. 8, the CPU 410 makes the above determination using pixels in a region FL having 3×3 pixels centered on the target pixel TP. That is, the region FL has eight pixels surrounding the target pixel TP. As represented by an equation of FIG. 8, for the eight pixels surrounding the target pixel TP, the CPU 410 calculates a difference $\Delta Vn$ on the basis of pixel values (R0, G0, B0) and pixel values (Rn, Gn, Bn). Here, the number n is an integer from 1 to 8 and specifies one of the eight pixels surrounding the target pixel TP. (R0, G0, B0) represents the pixel values of the target pixel, and (Rn, Gn, Bn) represents the pixel values of one of the eight pixels specified by the number n. Specifically, the difference $\Delta Vn$ is, as shown in the expression of FIG. 8, represented by a sum of absolute values of differences for respective three component values. That is, the $\Delta Vn$ is represented by a sum of an absolute value of (Rn−R0), an absolute value of (Gn−G0), and an absolute value of (Bn−B0). As shown in the equation of FIG. 8, the CPU 410 calculates the sum of the calculated eight differences $\Delta Vn$ as a variation value V of the target pixel TP.

When the variation value V of the target pixel TP is equal to or larger than a prescribed threshold Vth, the CPU 410 determines that the target pixel TP is the variation pixel. When the variation value V of the target pixel TP is smaller than the prescribed threshold Vth, the CPU 410 determines that the target pixel TP is the non-variation pixel. Accordingly, all the pixels in the target partial image are classified into one of the variation and non-variation pixels. In other words, the variation pixel is a pixel having pixel values whose difference from pixel values of pixels surrounding the pixel is greater than or equal to a prescribed reference value. Further, the non-variation pixel is a pixel having pixel values whose difference from pixel values of pixels surrounding the pixel is smaller than the prescribed reference value.

The CPU 410 calculates the number of variation pixels in the target partial image as the variation pixel number VC of the target partial image. The variation pixel number VC specifies a variation in pixel values among the plurality of pixels in the target partial image.

In S125, the CPU 410 compares the variation pixel number VC of the target partial image with a record value VCm. The record value VCm is a maximum value of the variation pixel numbers VC among the processed (selected) partial images. An initial value of the record value VCm is 0.

When the variation pixel number VC of the target partial image is larger than the record value VCm (S140: YES), in S135 the CPU 410 records the variation pixel number VC of the target partial image as a new record value VCm in the volatile storage device 420, for example. When the record value VCm has already recorded in the volatile storage device 420, the CPU 410 updates the record value VCm to the current variation pixel number VC. Then, in S140, the CPU 410 stores a coordinate value P (X1, Y1) of the uppermost-leftmost pixel in the target partial image as information indicating the partial image having the maximum variation. When the variation pixel number VC of the target partial image is equal to or smaller than the record value VCm (S130: NO), the CPU 410 skips S135 and S140 and proceeds to S145.

In S145, the CPU 410 determines whether or not all the partial images (FIG. 7) in the arrangement region SA1 have been processed as the target partial images. When there is any unprocessed partial image (S145: NO), the CPU 410 returns to S115 and selects the unprocessed partial image as the target partial image according to the order shown in FIG. 7. When all the partial images are processed (S145: YES), in S150 the CPU 410 determines whether or not the coordinate value P (X1, Y1) of the partial image has been stored in S140. Here, the coordinate value P (X1, Y1) of the partial image is stored in S140 except for a case where there is no variation pixel in the arrangement region SA1. Thus, there is hardly a case where the coordinate value P (X1, Y1) of the partial image is not stored in S140.

When the coordinate value P (X1, Y1) of the partial image has been stored (S150: YES), in S160 the CPU 410 determines a region corresponding to the partial image specified by the stored coordinate value P (X1, Y1) as the reference region SP. When the coordinate value P (X1, Y1) of the partial image is not stored (S150: NO), in S155 the CPU 410 determines a default region as the reference region SP. For example, the default region is a region of a partial image specified by the coordinate value P (X1, Y1)=(1, 1). After the reference region SP is determined, the CPU 410 ends the reference region determination process.

In the reference region determination process according to the first embodiment, the CPU 410 determines, as the reference region SP, the region corresponding to the partial image having the maximum variation pixel number VC among the variation pixel numbers VC of the plurality of partial images in the arrangement region SA1. For example, FIG. 5B shows the reference region SP set in the arrangement region SA1 of the right-side scan image 20R.

After completion of the reference region determination process, in S35 of FIG. 2, the CPU 410 executes a corresponding region determination process. The corresponding region determination process determines a corresponding region CP in the left-side scan image 20L corresponding to the reference region SP in the right-side scan image 20R.

Specifically, as shown in FIG. 3, a specified portion SPT is defined as a part of the document 10 that is represented as the reference region SP in the right-side scan image 20R. The corresponding region CP corresponding to the reference region SP is defined as a region representing the specified portion SPT of the document 10 in the left-side scan image 20L.

Figure 9:
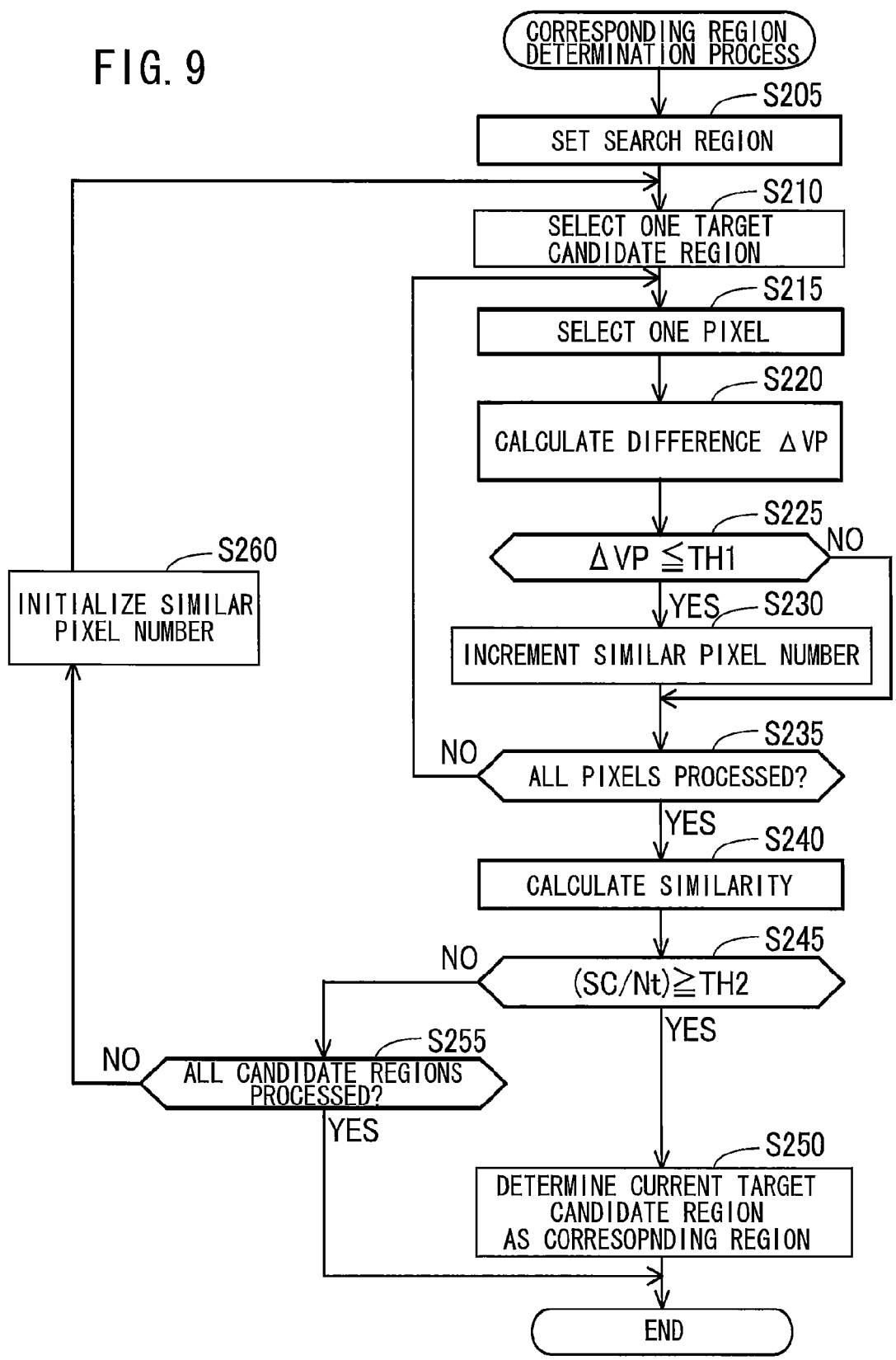
FIG. 9 is a flowchart illustrating a corresponding region determination process according to the first embodiment.

FIG. 9 is a flowchart illustrating the corresponding region determination process. In S205, the CPU 410 sets a search region SA2 in the left-side scan image 20L. FIG. 5A shows an example of the search region SA2 set in the left-side scan image 20L. The search region SA2 is a prescribed region in the scan image 20L. A length of the search region SA2 in the vertical direction is equal to the entire length of the left-side scan image 20L in the vertical direction. A length of the search region SA2 in the horizontal direction is 20% to 50% of a length of the left-side scan image 20L in the horizontal direction, for example. The search region SA2 includes a right end of the left-side scan image 20L, a right side portion of a top end of the left-side scan image 20L, and a right side portion of a bottom end of the left-side scan image 20L.

Figure 10:
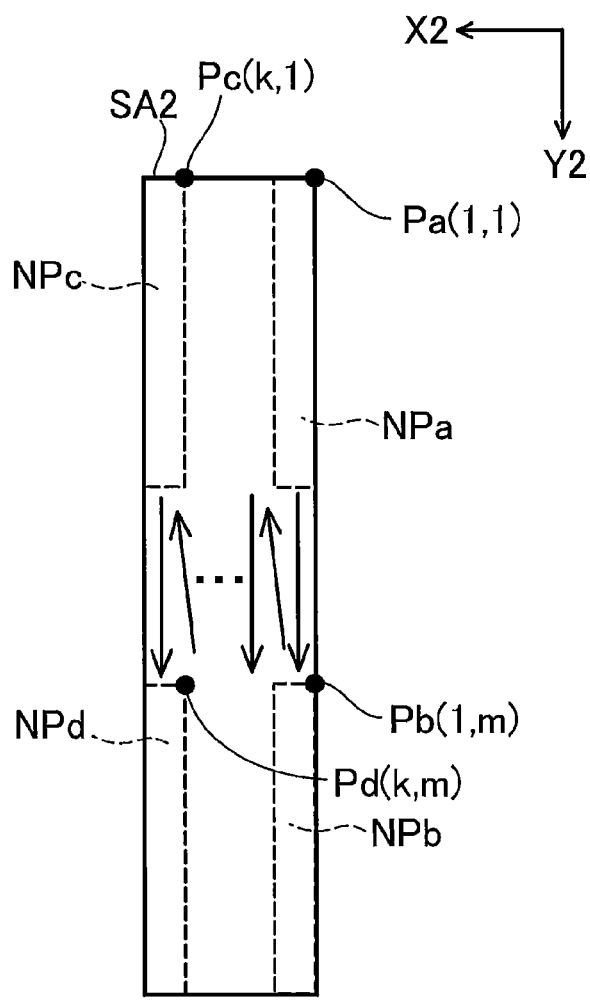
FIG. 10 is an explanatory diagram illustrating a plurality of candidate regions disposed in a search region according to the first embodiment.

In S210, the CPU 410 selects one target candidate region from a plurality of candidate regions that can be disposed in the search region SA2. FIG. 10 explains the plurality of candidate regions that can be disposed in the search region SA2. As shown in FIG. 10, a coordinate value of a pixel in the search region SA2 is represented by using a two-dimensional coordinate system having an X2 axis whose positive direction is leftward and a Y2 axis whose positive direction is downward. In this coordinate system, the coordinate value (1, 1) indicates an uppermost-rightmost pixel in the search region SA2.

A size and a shape of the candidate region are the same as those of the reference region SP (FIG. 5B) set in the right-side scan image 20R by the reference region determination process of FIG. 6.

As shown in FIG. 10, the plurality of candidate regions includes candidate regions NPa, NPb, NPc, and NPd. A top end and a right end of the candidate region NPa coincide with the top end and the right end of the search region SA2 respectively. The candidate region NPa includes an uppermost-rightmost point Pa among pixels therein. The coordinate value of the pixel Pa is (1, 1). A bottom end and a right end of the candidate region NPb coincide with the bottom end and the right end of the search region SA2 respectively. The candidate region NPb includes an uppermost-rightmost point Pb among pixels therein. The coordinate value of the pixel Pb is (1, m). Here, m is a natural number. A top end and a left end of the candidate region NPc coincide with the top end and the left end of the search region SA2 respectively. The candidate region NPc includes an uppermost-rightmost point Pc among pixels therein. The coordinate value of the pixel Pc is (k, 1). Here, k is a natural number. A bottom end and a left end of the candidate region NPd coincide with the bottom end and the left end of the search region SA2 respectively. The candidate region NPd includes an uppermost-rightmost point Pd among pixels therein. The coordinate value of the pixel Pd is (k, m). As described above, a representative pixel of a partial image is an uppermost-rightmost pixel of the partial image.

The uppermost-rightmost point of the candidate region can be positioned at an arbitrary position having a coordinate value (p, q) from among (k×m) coordinate values. Here, p is an arbitrary integer equal to or more than 1 and equal to or less than k, and q is an arbitrary integer equal to or more than 1 and equal to or less than m. Thus, (k×m) candidate regions can be set in the search region SA2.

An order in which the CPU 410 selects the candidate region will be explained. As indicated by arrows in FIG. 10, the CPU 410 selects the candidate region NPa at the upper-right end as a first target candidate region from the (k×m) candidate regions. Subsequently, the CPU 410 selects sequentially candidate regions while shifting a position of pixel downward one by one. Then, after the CPU 410 selects the candidate region NPb at the lowest right end, the CPU 410 selects a candidate region shifted leftward from the candidate region NPa by one pixel. That is, when the lowermost candidate region is currently selected, the CPU 410 selects, as a next candidate region, an uppermost candidate region that is shifted leftward from the currently selected lowermost candidate region by one pixel. Subsequently, the CPU 410 selects sequentially candidate regions while shifting a position of the pixel downward one by one. By repeating the selection of the candidate regions as described above, finally, the CPU 410 selects the candidate region NPd at the lower-left end.

After one target candidate region is selected, in S215 the CPU 410 selects a target pixel from all the pixels in the reference region SP (FIG. 5B) in the right-side scan image 20R.

In S220, the CPU 410 calculates a difference ΔVP on the basis of pixel values of the target pixel in the reference region SP and a value of a pixel in the target candidate region corresponding to the target pixel. (R1, G1, B1) denotes pixel values of the target pixel and (R2, G2, B2) denotes pixel values of the pixel in the target candidate region corresponding to the target pixel. The difference ΔVP is represented by a sum of absolute values of differences for respective three component values. That is, the ΔVP is represented by a sum of an absolute value of (R1−R2), an absolute value of (G1−G2), and an absolute value of (B1−B2). Alternatively, the Euclidean distance between (R1, 01, B1) and (R2, G2, B2) may be used as the difference ΔVP.

In S225, the CPU 410 determines whether the calculated difference ΔVP is smaller than or equal to a prescribed reference value TH1. When the difference ΔVP is smaller than or equal to the prescribed reference value TH1 (S225: YES), in S230 the CPU 410 increments a similar pixel number SC. This is because when the difference ΔVP is smaller than or equal to the prescribed reference value TH1, the target pixel in the reference region SP can be determined to be similar to the pixel in the target candidate region corresponding to the target pixel. The initial value of the similar pixel number SC is zero.

When the difference ΔVP is larger than the prescribed reference value TH1 (S225: NO), the CPU 410 skips S230 and proceeds to S235.

In S235, the CPU 410 determines whether or not all the pixels in the reference region SP have been processed as the target pixels. When there is any unprocessed pixel (S235: NO), the CPU 410 returns to S215 and selects the unprocessed pixel as the target pixel. When all the pixels is processed (S235: YES), the CPU 410 proceeds to S240.

In S240, the CPU 410 calculates a degree of similarity (SC/Nt) (hereinafter, simply referred to as similarity) between the reference region SP and the target candidate region. The similarity (SC/Nt) is a ratio of the similar pixel number SC to a total number Nt of pixels in the reference region SP. The larger the similarity (SC/Nt) is, the more similar the reference region SP and the target candidate region are to each other.

In S245, the CPU 410 determines whether or not the similarity (SC/Nt) is equal to or greater than a threshold value TH2.

When the similarity (SC/Nt) is greater than or equal to the threshold value TH2 (S245: YES), in S250 the CPU 410 determines a current target candidate region as the corresponding region CP corresponding to the reference region SP and ends the corresponding region determination process.

When the similarity (SC/Nt) is lower than the threshold value TH2 (S245: NO), in S255 the CPU 410 determines whether or not all the candidate regions (FIG. 10) in the search region SA2 have been processed as the target candidate regions. When there is any unprocessed candidate regions (S255: NO), in S260 the CPU 410 initializes the similar pixel number SC and then returns to S210. In this case, the CPU 410 selects the unprocessed candidate region as the target candidate region according to the order shown in FIG. 10. When all the candidate regions is processed (S255: YES), the CPU 410 ends the corresponding region determination process without determining the corresponding region CP corresponding to the reference region SP.

FIG. 5A shows an example of the corresponding region CP set in the search region SA2 of the left-side scan image 20L.

After completion of the corresponding region determination process, in S40 of FIG. 2, the CPU 410 execute a combining process. In the combining process, the right-side scan data and the left-side scan data are used to generate combined image data representing a combined image 30 obtained by joining the right-side document image HIR in the right-side scan image 20R and the left-side document image HIL in the left-side scan image 20L.

Figure 11:
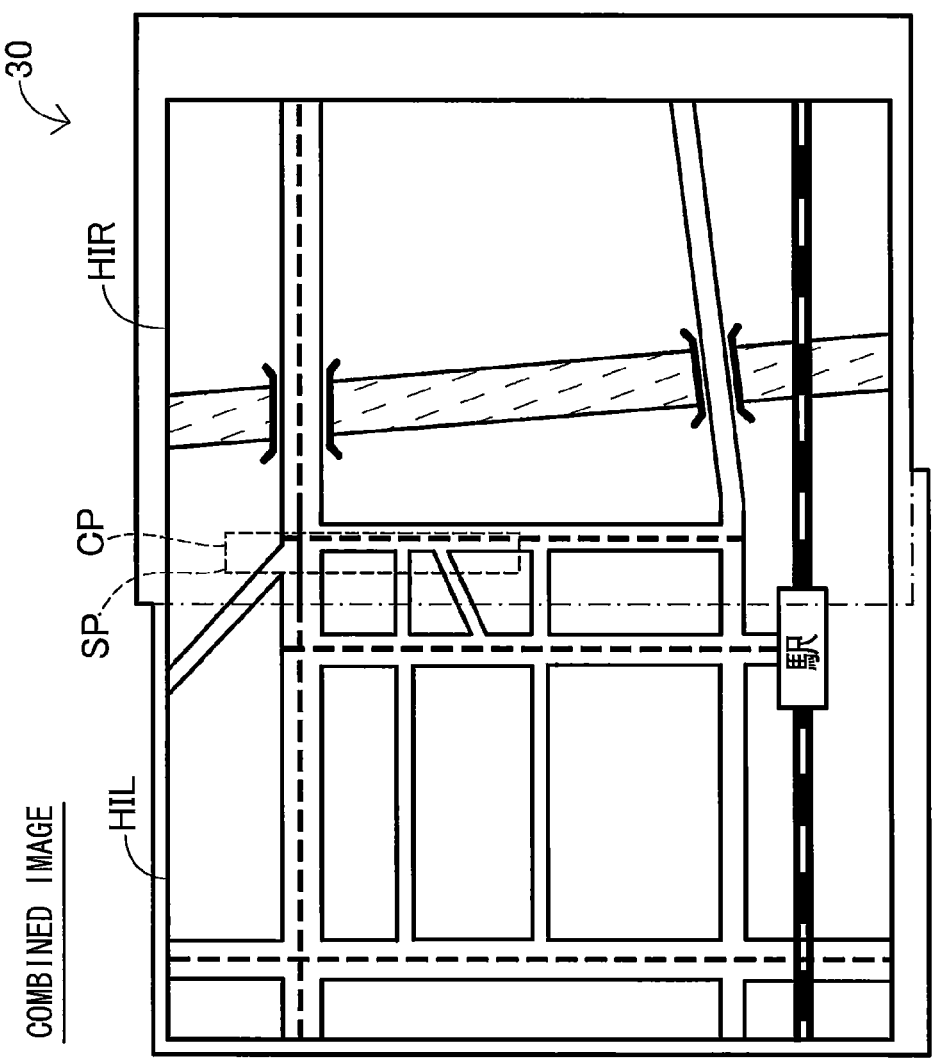
FIG. 11 is an example of a combined image according to the first embodiment.

FIG. 11 shows an example of the combined image 30. As illustrated in FIG. 11, to obtain the combined image 30, the right-side document image HIR and the left-side document image HIL are combined such that the reference region SP in the right-side document image HIR and the corresponding region CP in the left-side document image HIL overlap each other. In the combined image 30 of the embodiment, values of the pixels in the right-side document image HIR (right-side scan image 20R) are preferentially used as the value of the pixels in the overlapping region between the right-side document image HIR and the left-side document image HIL. In this manner, the right-side document image HIR and the left-side document image HIL are joined, thereby generating the combined image 30 representing the document 10 of FIG. 3.

In the corresponding region determination process of FIG. 9, when the corresponding region CP corresponding to the reference region SP cannot be determined (when S255 is determined to YES in FIG. 9), there is generated combined image data representing a combined image obtained by joining two scan images in such a single uniform manner that the right end of the left-side scan image 20L and the left end of the right-side scan image 20R contact each other (not shown).

In S45 of FIG. 2, the CPU 410 transmits the generated combined image data to the multifunction peripheral 200. Upon receiving the combined image data, the CPU 210 of the multifunction peripheral 200 stores the combined image data in the non-volatile storage device 230 and notifies the user of the reception of the combined image data. The combined image data is made available to the user. For example, the user allows the multifunction peripheral 200 to print the combined image 30 by using the combined image data.

As described above, a position of the reference region SP in the right-side scan image 20R is determined on the basis of a variation in value among the plurality of pixels in the right-side scan image 20R (S30 of FIG. 2, and FIG. 6). As a result, the position of the reference region SP in the right-side scan image 20R is appropriately determined, so that the right-side scan image 20R and the left-side scan image 20L can be appropriately combined.

Specifically, a region lacks in characteristics when a variation of the region in the pixel value among the pixels therein is comparatively small. Thus, if such a region is determined as the reference region SP, the corresponding region CP in the left-side scan image 20L is likely to be difficult to determine. For example, an incorrect region in the left-side scan image 20L is likely to be determined as the corresponding region CP. The region where a variation in the pixel value among the pixels is comparatively small is a region representing a background or a region where the color inside an object hardly changes, for example.

On the other hand, a region includes comparatively many edge portions and is thus highly likely to include a characteristic part when a variation of the region in the pixel value among pixels therein is comparatively large. Thus, if such a region is determined as the reference region SP, the corresponding region CP in the left-side scan image 20L is highly likely to be correctly determined. In other words, when the region where a variation in the pixel value among the pixels therein is comparatively large is set as the reference region, the corresponding region CP corresponding to the reference region SP can be determined with higher accuracy than when the region where a variation in the pixel value among the pixels therein is comparatively small is determined as the reference region.

According to the above first embodiment, in S120 (FIG. 6) a value (specifically, the variation pixel number VC) representing a variation in pixel value among the plurality of pixels in the partial image is calculated for the plurality of partial images (specifically, the (s×t) partial images of FIG. 7) in the right-side scan image 20. Then, a region corresponding to the partial image having the maximum variation value indicating a variation among the plurality of partial images is determined as the reference region SP (S130 to S140 and S160 of FIG. 6). Thus, by using the region where a variation in pixel value among the plurality of pixels therein is largest as the reference region SP, the corresponding region CP corresponding to the reference region SP can be determined with high accuracy. Thus, when the right-side scan image 20R and the left-side scan image 20L are combined, the configuration of the embodiment can improve accuracy (hereinafter, sometimes referred to merely as "combination accuracy") of determining a position at which the right-side document image HIR in the right-side scan image 20R and the left-side document image HIL in the left-side scan image 20L are combined.

B. Second Embodiment

Figure 12:
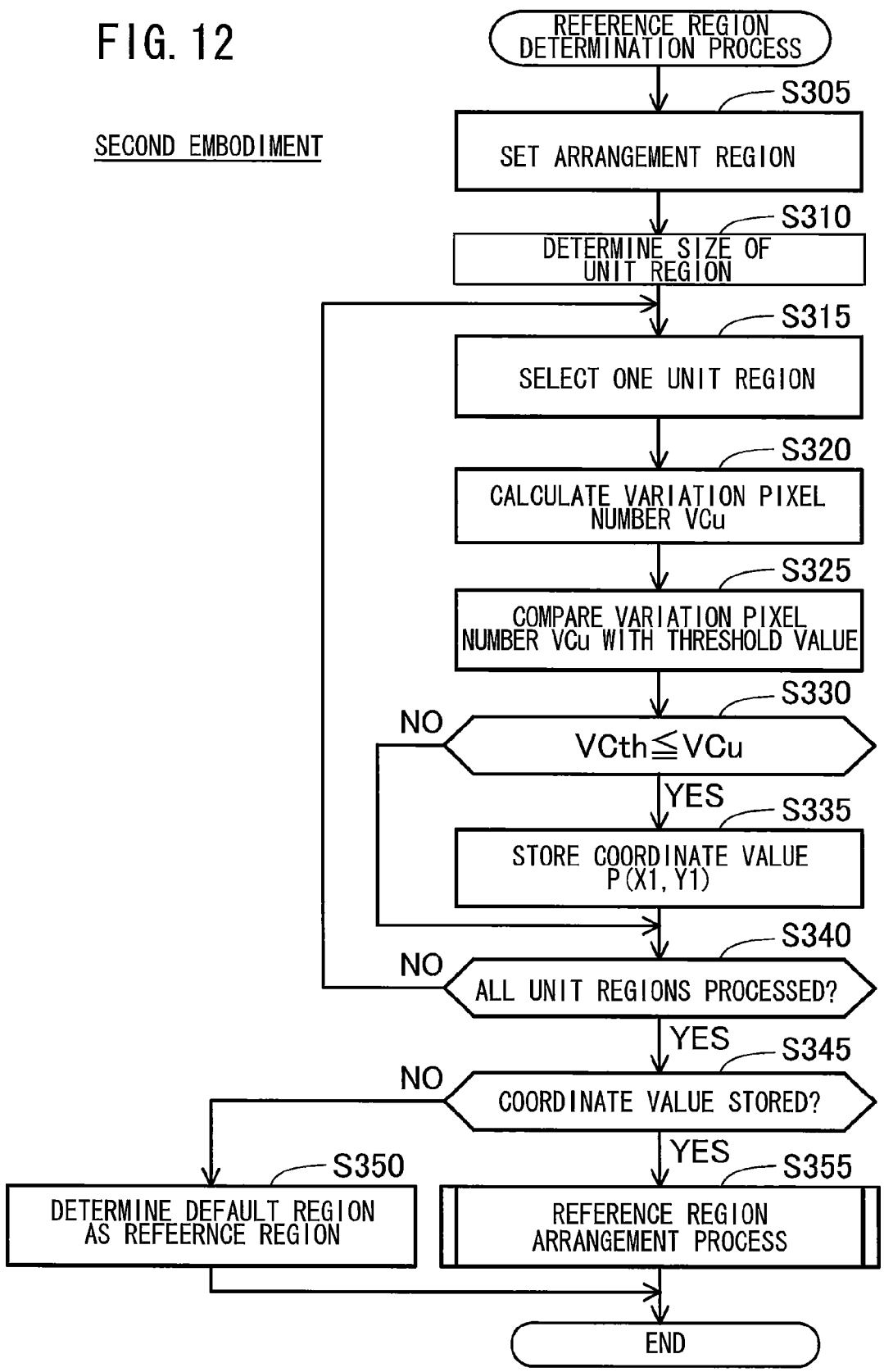
FIG. 12 is a flowchart illustrating a reference region determination process according to a second embodiment.
Figure 13A:
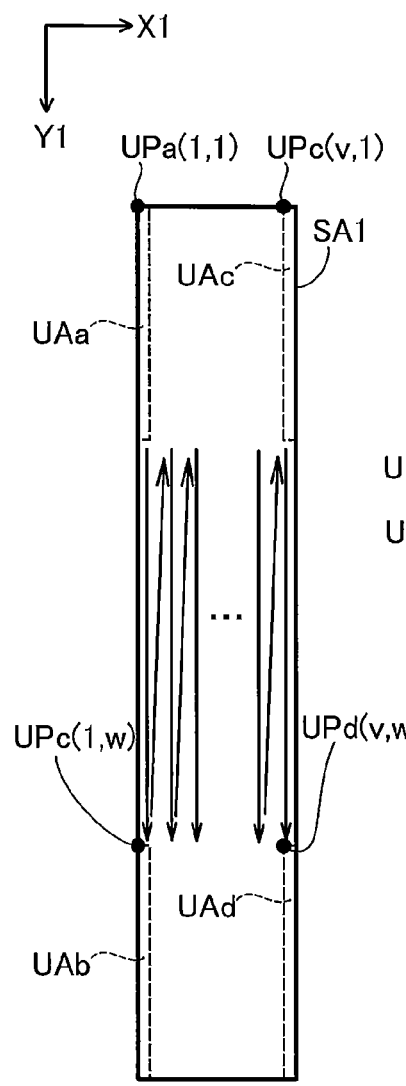
FIGS. 13A-13C are explanatory diagrams illustrating the reference region determination process according to the second embodiment.
Figure 13B:
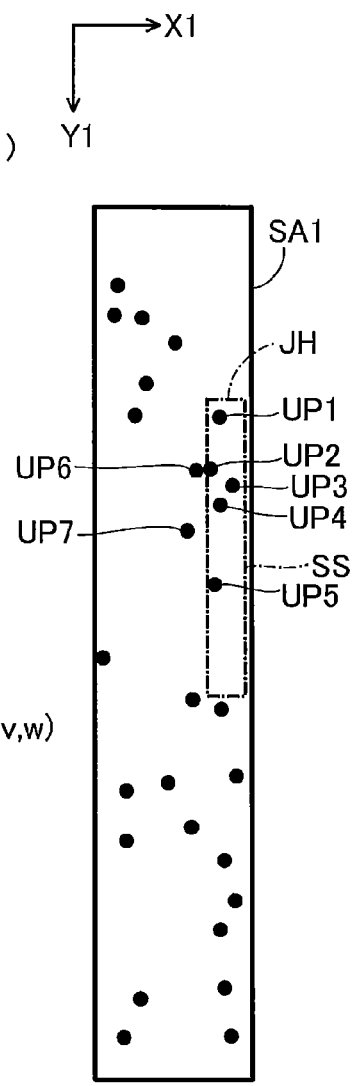
Figure 13C:
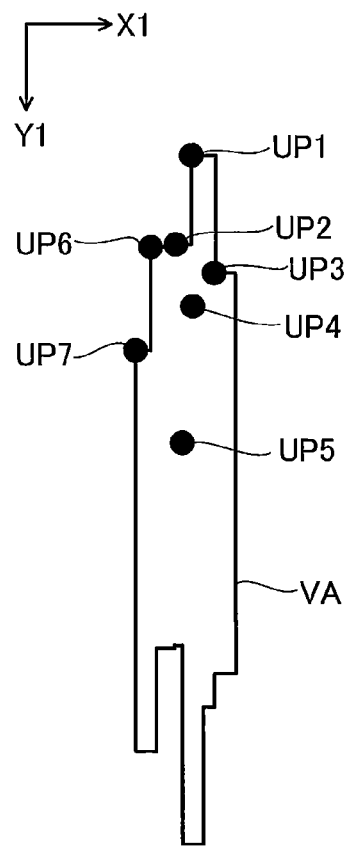

Next, an image processing system according to a second embodiment will be described, wherein like parts and components are designated with the same reference numerals to avoid duplicating description. A reference region determination process of the second embodiment is different from that of the first embodiment. Remaining configurations and processes of the second embodiment are the same as those of the first embodiment. FIG. 12 shows a flowchart of the reference region determination process of the second embodiment. FIGS. 13A-13C are explanatory diagrams illustrating the reference region determination process according to the second embodiment.

As shown in FIG. 12, in S305 the CPU 410 sets an arrangement region SA1 similarly to S105 (FIG. 6) of the first embodiment.

In S310, the CPU 410 determines a size of a unit region to be disposed in the arrangement region SA1. In the second embodiment, the size of the unit region is set to a prescribed value. The size of the unit region is smaller than the size of the reference region SP of the first embodiment. Specifically, a size of one unit region in the horizontal direction is about 1 to about 2 pixels, and a size of one unit region in the vertical direction corresponds to about ⅙ to about ⅓ of the number of pixels arranged in the vertical direction of the right-side scan image 20R.

In S315, the CPU 410 selects one target unit region from the plurality of unit regions in the arrangement region SA1. FIG. 13A shows the plurality of unit regions in the arrangement region SA1. In FIGS. 13A-13C, a position of a pixel in the arrangement region SA1 is represented by using a two-dimensional coordinate system having an X1 axis whose positive direction is rightward and a Y1 axis whose positive direction is downward. In this coordinate system, the coordinate value (1, 1) indicates an uppermost-leftmost pixel in the arrangement region SA1.

As shown in FIG. 13A, a plurality of unit regions can be defined in the arrangement region SA1. The plurality of unit regions includes unit regions UAa, UAb, UAc, and UAd. An top end and a left end of the unit region UAa respectively coincide with the top end and the left end of the arrangement region SA1. The unit region UAa includes an uppermost-leftmost pixel UPa among pixels therein whose coordinate value is (1, 1). A bottom end and an left end of the unit region UAb respectively coincide with the bottom end and the left end of the arrangement region SA1. The unit region UAb includes an uppermost-leftmost pixel among pixels UPb therein whose coordinate value is (1, w). Here, w is a natural number. A top end and an right end of the unit region UAc respectively coincide with the top end and the right end of the arrangement region SA1. The unit region UAc includes an uppermost-leftmost pixel UPc among pixels therein whose coordinate value is (v, 1). Here, v is a natural number. A bottom end and an right end of the unit region UAd coincide with the bottom end and the right end of the arrangement region SA1. The unit region UAd includes an uppermost-leftmost pixel UPd among pixels therein whose coordinate value is (v, w).

A target unit region is selected from (v×w) unit regions whose uppermost-leftmost pixel is positioned at a coordinate value of (e, f). Here, e is an arbitrary integer equal to or more than 1 and equal to or less than v, and f is an arbitrary integer equal to or more than 1 and equal to or less than w.

An order in which the CPU 410 selects the unit region will be explained. As indicated by arrows in FIG. 13A, the CPU 410 selects the unit region UAa at the upper-left end as a first target unit region from the (v×w) unit regions. Subsequently, the CPU 410 selects sequentially unit regions while shifting a position of pixel downward one by one. Then, after the CPU 410 selects the unit region UAb at the lowest left end, the CPU 410 selects a unit region shifted rightward from the unit region UAa by one pixel. That is, when the lowermost unit region is currently selected, the CPU 410 selects, as a next unit region, an uppermost unit region that is shifted rightward from the currently selected lowermost unit region by one pixel. Subsequently, the CPU 410 selects sequentially unit regions while shifting a position of the pixel downward one by one. By repeating the selection of the unit regions as described above, finally, the CPU 410 selects the unit region UAd at the lower-right end.

When one target unit region is selected, in S320 the CPU 410 calculates a variation pixel number VCu for the target unit region. Specifically, the CPU 410 calculates the variation pixel number VCu similarly to the variation pixel number VC calculated in S120 (FIG. 6) of the first embodiment. That is, the CPU 410 classifies each of the plurality of pixels in the unit region into a variation pixel and a non-variation pixel. The CPU 410 sets the number of variation pixels in the target unit region as the variation pixel number VC of the target unit region. The variation pixel number VC specifies a variation in pixel values among the plurality of pixels in the target unit region.

In S325, the CPU 410 compares the variation pixel number VCu of the target unit region and a prescribed threshold value VCth. When the variation pixel number VCu of the unit region is larger than or equal to the prescribed threshold value VCth, a variation in pixel value among the pixels in the unit region is comparatively large. Thus, the unit region where the variation pixel number VCu of the unit region is larger than or equal to the prescribed threshold value VCth is referred to as a variation unit region. When the variation pixel number VCu of the unit region is smaller than the prescribed threshold value VCth, the variation in pixel value among the pixels in the unit region is comparatively small. Thus, the unit region where the variation pixel number VCu of the unit region is smaller than the prescribed threshold value VCth, is referred to as a non-variation unit region.

When the variation pixel number VCu of the target unit region is larger than or equal to the threshold value VCth (S330: YES), in S335 the CPU 410 stores a coordinate value UP (X1, Y1) of the uppermost-leftmost pixel in the target unit region as information indicating the variation unit region in the volatile storage device 420, for example. If at least one of the coordinate value UP has already been stored in the volatile storage device 420, the CPU 410 stores the current coordinate value UP (X1, Y1) together with the already stored coordinate values UP. That is, in the second embodiment, the stored coordinate values UP are neither deleted nor overwritten. When the variation pixel number VCu of the target unit region is smaller than the threshold value VCth (S330: NO), the CPU 410 skips S335 and proceeds to S340.

In S340, the CPU 410 determines whether or not all the unit regions (FIG. 13A) in the arrangement region SA1 have been processed as the target unit regions. When there is any unprocessed unit region (S340: NO), the CPU 410 returns to S315 and selects the unprocessed unit region as the target unit region according to the order shown in FIG. 13. When all the unit regions are processed (S340: YES), in S345 the CPU 410 determines whether or not at least one coordinate value UP (X1, Y1) of the unit region has been stored in S335. Here, the coordinate value UP (X1, Y1) of the unit region is stored in S335 except for a case where there is no variation unit region in the arrangement region SA1. Thus, there is hardly a case where none of the coordinate value UP (X1, Y1) of the unit region is stored in S335.

When none of the coordinate value UP (X1, Y1) of the unit region has been stored (S345: NO), in S350 the CPU 410 determines a default region as the reference region SP. For example, the default region is the same as the default region used in S155 of the first embodiment (FIG. 6). When the coordinate value UP (X1, Y1) of the unit region is stored (S345: YES), in S355 the CPU 410 executes a reference region arrangement process.

Figure 14:
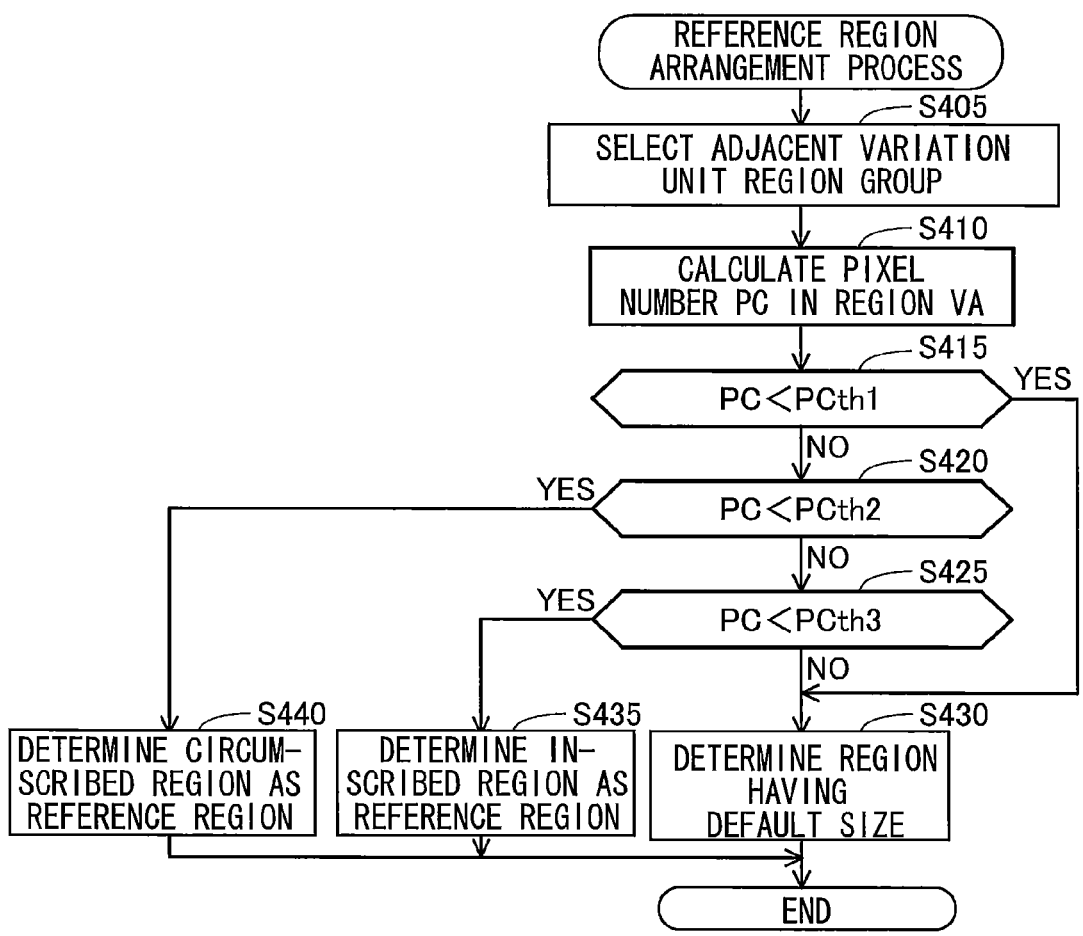
FIG. 14 is a flowchart illustrating a reference region arrangement process according to the second embodiment.

FIG. 14 is a flowchart illustrating the reference region arrangement process. At a time point when the reference region arrangement process of FIG. 14 is started, a plurality of variation unit regions are specified in the arrangement region SA1 as shown in FIG. 13B. In FIG. 13B, each black dot represents a position of an uppermost-leftmost pixel (also referred to as a region specifying pixel) in the specified variation unit region.

As shown in FIG. 14, in S405, the CPU 410 selects an adjacent variation unit region group from among the plurality of specified variation unit regions. The adjacent variation unit region group includes one or more variation unit regions adjacent to each other. Specifically, the CPU 410 scans the arrangement region SA1 by using a frame JH (FIG. 13B) having a prescribed size, and determines a position of the determination frame JH that includes the largest number of the region specifying pixels. A size of the determination frame JH is the same as that of the reference region SP in the first embodiment, for example.

FIG. 13B shows an example of the determination frame JH that includes the largest number of the region specifying pixels. The determination frame JH of FIG. 13B includes five region specifying pixels UP1 to UP5. The CPU 410 further specifies region specifying pixels that are located within a reference distance Dth from at least one of the five region specifying pixels UP1 to UP5. The CPU 410 may specify region specifying pixels that are located within the reference distance Dth from all of the five region specifying pixels UP1 to UP5. In the example shown in FIG. 13B, two region specifying pixels UP6 and UP7 that is located within the reference distance Dth from at least one of the five region specifying pixels UP1 to UP5 are specified. As a result, in the example of FIG. 13B, seven variation unit regions corresponding to the seven region specifying pixels UP1 to UP7 are selected as the adjacent variation unit region group. In other words, the CPU 410 specifies a dense region where a density of the variation unit regions is highest by using the determination frame JH. That is, in the dense region, the variation unit regions are most densely located in the right-side scan image. The adjacent variation unit region group includes one or more variation unit regions included in the specified dense region. In this manner, the adjacent variation unit region group to be used in determination of the reference region SP is properly determined.

In S410, the CPU 410 calculates a pixel number PC that is number of pixels in a region VA (hereinafter, referred to as a variation region VA) defined by the adjacent variation unit region group. FIG. 13C shows an example of the variation region VA defined by the adjacent variation unit region group. The variation region VA is composed of a plurality of pixels included in at least one unit region of one or more variation unit regions included in the adjacent variation unit region group. In the embodiment, the variation region VA have all pixels of all the variation unit regions included in the adjacent variation unit region group.

In S415 to S440, the CPU 410 compares the calculated pixel number PC and first to third pixel number threshold values PCth1 to PCth3 and determines a reference region SP. A magnitude relationship between the first to third pixel number threshold values PCth1 to PCth3 is PCth1<PCth2<PCth3.

In S415, the CPU 410 determines whether or not the pixel number PC is smaller than the first pixel number threshold value PCth1. When the pixel number PC is smaller than the first pixel number threshold value PCth1 (S415: YES), in S430 the CPU 410 determines a region having a default size as the reference region SP. In this case, the variation region VA is excessively small, so that if a circumscribed rectangle of the variation region VA is set as the reference region SP, the reference region SP becomes excessively small. The reference region SP having the default size is the same in size as the reference region SP (FIG. 5B) in the first embodiment. For example, the reference region SP is determined to be a default-sized region centering at a centroid position of the variation region VA.

When the pixel number PC is larger than or equal to the first pixel number threshold value PCth1 (S415: NO), in S420 the CPU 410 determines whether or not the pixel number PC is smaller than the second pixel number threshold value PCth2. When the pixel number PC is smaller than the second pixel number threshold value PCth2 (S420: YES), in S440 the CPU 410 determines the circumscribed rectangle of the variation region VA as the reference region SP. That is, the reference region SP is a rectangle region enclosing the variation region VA. In other words, the reference region SP is a rectangle region encompassing the variation region VA. This is because the circumscribed rectangle of the variation region VA has a size suitable for the reference region SP in this case.

Figure 15A:
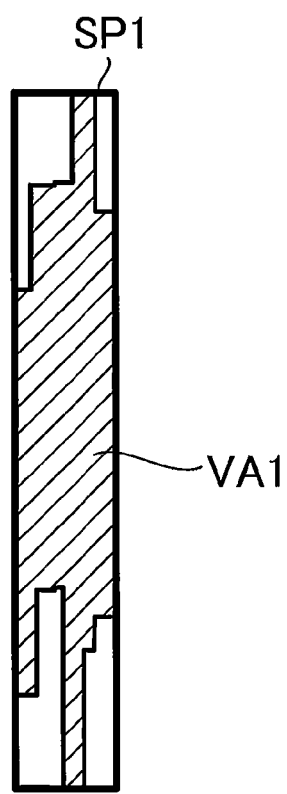
FIGS. 15A and 15B are examples of a reference region determined on the basis of a variation region according to the second embodiment.
Figure 15B:
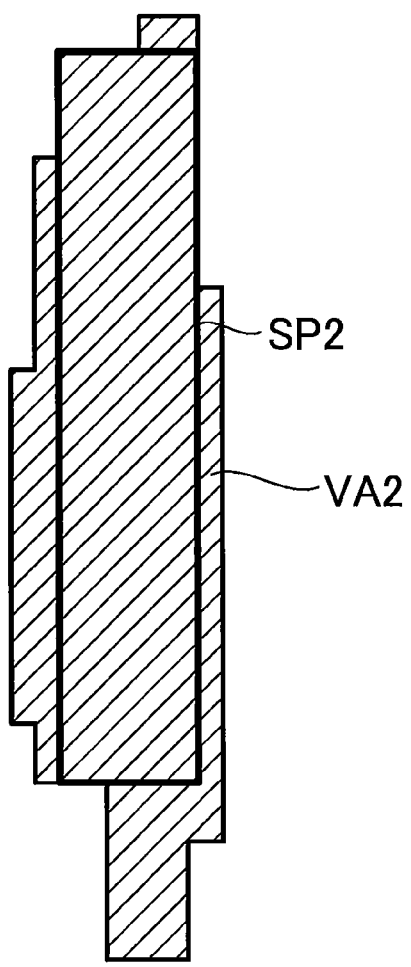

FIGS. 15A and 15B shows examples of the reference region SP determined on the basis of the variation region VA. FIG. 15A illustrates an example in which the circumscribed rectangle of a specific variation region VA1 is determined as a specific reference region SP1. By setting the circumscribed rectangle of the variation region VA as the reference region SP, the reference region SP can appropriately be determined such that a variation among the pixel values therein becomes large.

When the pixel number PC is larger than or equal to the second pixel number threshold value PCth2 (S420: NO), in S425 the CPU 410 determines whether or not the pixel number PC is smaller than the third pixel number threshold value PCth3. When the pixel number PC is smaller than the third pixel number threshold value PCth3 (S425: YES), in S145 the CPU 410 determines an inscribed rectangle of the variation region VA as the reference region SP. That is, the reference region SP is a rectangle region enclosed by the variation region VA. In other words, the reference region SP is a rectangle region encompassed by the variation region VA. This is because the inscribed rectangle of the variation region VA has a size suitable for the reference region SP in this case.

FIG. 15B illustrates an example of the inscribed rectangle of a specific variation region VA2 that is determined as a specific reference region SP2. By setting the inscribed rectangle of the variation region VA2 as the reference region SP, the reference region SP can appropriately be determined such that a variation among the pixel values therein becomes large.

When the pixel number PC is larger than or equal to the third pixel number threshold value PCth3 (S425: NO), the CPU 410 determines a default-sized region as the reference region SP in S430. In this case, the variation region VA is excessively large, so that if the inscribed rectangle of the variation region VA is set as the reference region SP, the reference region SP becomes excessively large. For example, a default-sized region centering at a centroid position of the variation region VA is determined as the reference region SP.

The CPU 410 ends the reference region arrangement process after one of the processes S440, S435, and S430. Similarly to the first embodiment, the corresponding region determination process is performed after the reference region arrangement process. Here, a size and a shape of the candidate region are the same as those of the reference region SP set in the right-side scan image 20R by the reference region determination process of FIG. 14.

As described above, similarly to the first embodiment, a position of the reference region SP in the right-side scan image 20R is determined on the basis of a variation in pixel value among the plurality of pixels in the right-side scan image 20R. Specifically, the reference region SP is determined on the basis of the variation unit region (S405 of FIG. 14, for example). As a result, the position of the reference region SP in the right-side scan image 20R is appropriately determined, so that the right-side scan image 20R and the left-side scan image 20L can be appropriately combined.

According to the above second embodiment, a shape of the reference region SP is determined on the basis of a variation in pixel value among the plurality of pixels in the right-side scan image 20R. As a result, the shape of the reference region can appropriately be determined on a basis of a variation in pixel value among the pixels in the right-side scan image 20R. Thus, the corresponding region CP corresponding to the reference region SP can be properly determined, allowing the right-side scan image 20R and the left-side scan image 20L to be combined successfully.

The plurality of unit regions are set in the right-side scan image 20R (FIG. 13A), and a value (specifically, the variation pixel number VCu) representing a variation in value among the plurality of pixels in the unit region is calculated (S320 of FIG. 12). Thus, at least one variation unit region (specifically, the adjacent variation unit region group) is selected (S405 of FIG. 14). Here, the variation unit region is a unit region whose value representing the variation of the unit region is larger than or equal to the threshold value VCth. The selected at least one variation unit region is used to determine the reference region SP (S430 to S440 of FIG. 14). Thus, the shape and position of the reference region SP are properly determined on the basis of the at least one variation unit region. This configuration can prevent the variation in pixel value among the pixels in the reference region SP from becoming excessively small. As a result, when the right-side scan image 20R and the left-side scan image 20L are combined, the combination accuracy can be improved.

For example, as shown in FIG. 15A, a circumscribed region of the selected at least one variation unit region, that is, the variation region VA (FIG. 13C) is determined as the reference region SP. Alternatively, as shown in FIG. 15B, a inscribed region of the variation region VA (FIG. 13C) is determined as the reference region SP. As a result, the reference region SP is appropriately determined, so that when the right-side scan image 20R and the left-side scan image 20L are joined, the combination accuracy can be improved.

More specifically, when the entire size of the selected at least one variation unit region (that is, the pixel number PC of the variation region VA) is smaller than a reference size (that is, the second pixel number threshold value PCth2) (S420: YES), in S440 the circumscribed region of the variation region VA is determined as the reference region SP. When the entire size of the selected at least one variation unit region is larger than or equal to the reference size (the second pixel number threshold value PCth2) (S420: NO), in S435 the inscribed region of the variation region VA is determined as the reference region SP. Thus, the reference region SP is appropriately determined in accordance with the entire size of the variation region VA.

The plurality of unit regions set in the arrangement region SA1 are classified into a plurality of first-type unit regions (specifically, variation unit regions) where the variation is larger than or equal to the threshold value and a plurality of second-type unit regions (specifically, unit regions other than the variation unit region) where the variation is smaller than the threshold value (S320 to S335, FIG. 13B). The at least one adjacent variation unit region adjacent to each other (that is, adjacent variation unit region group) is selected from among the plurality of first-type unit regions (S405 of FIG. 14). Thus, proper unit regions for determining the reference region SP can be selected from among the plurality of unit regions.

C. Third Embodiment

Figure 16:
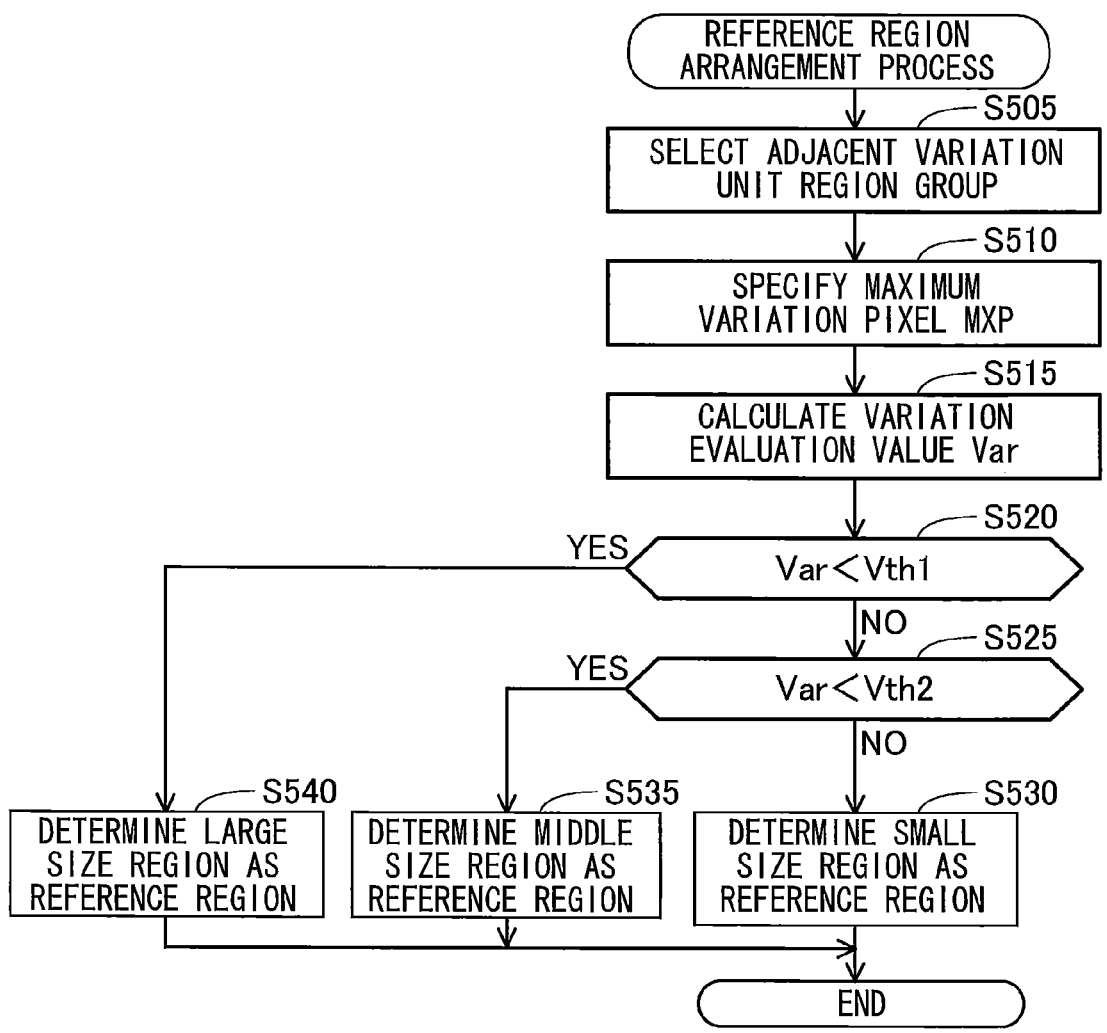
FIG. 16 is a flowchart illustrating a reference region arrangement process according to a third embodiment.
Figure 17:
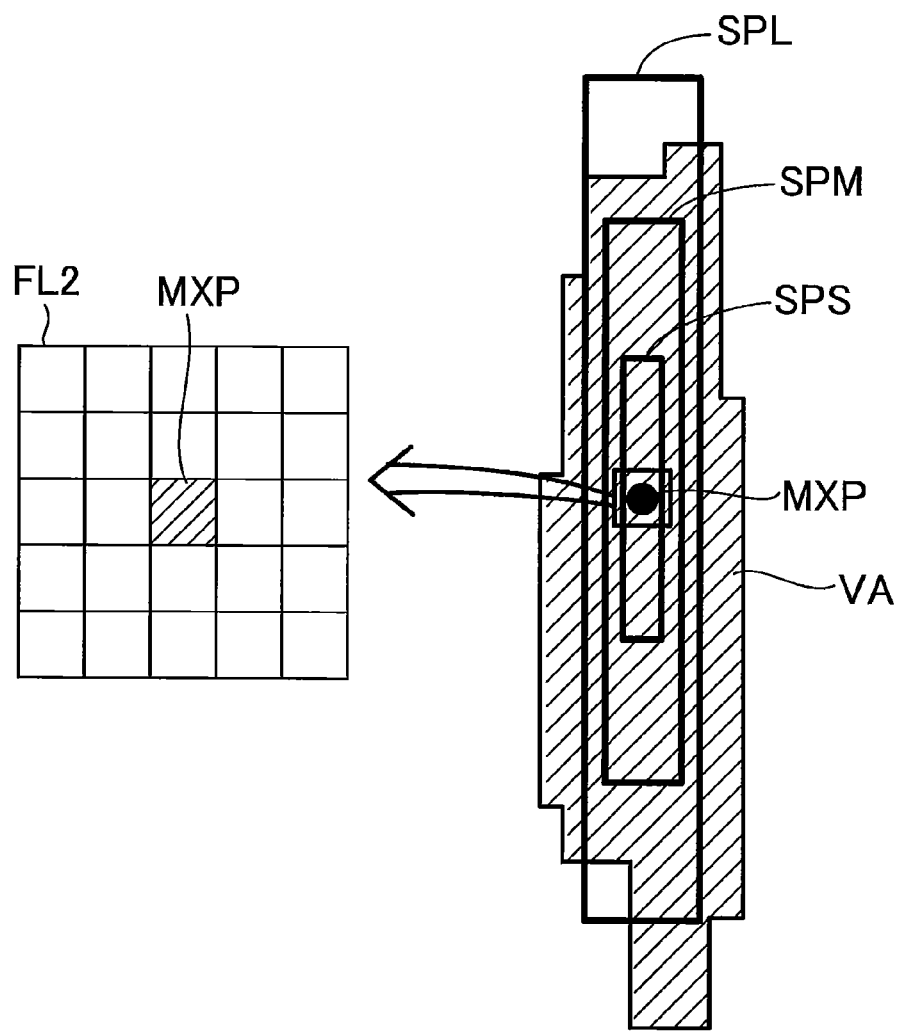
FIG. 17 is an explanatory diagram illustrating the reference region arrangement process according to the third embodiment.

Next, an image processing system according to a third embodiment will be described, wherein like parts and components are designated with the same reference numerals to avoid duplicating description. A reference region arrangement process of the third embodiment is different from that of the second embodiment. Remaining configurations and processes of the third embodiment are the same as those of the second embodiment. FIG. 16 shows a flowchart of the reference region arrangement process of the third embodiment. FIG. 17 is an explanatory diagram illustrating the reference region arrangement process according to the third embodiment.

As shown in FIG. 16, in S505, the CPU 410 selects an adjacent variation unit region group from among the plurality of specified variation unit regions, similarly to the S405 (FIG. 14). In S510, the CPU 410 specifies a maximum variation pixel MXP in the variation region VA defined by the adjacent variation unit region group. The maximum variation pixel MXP is a pixel having a maximum variation value V (see FIG. 8) among a plurality of pixels in the variation region VA. FIG. 17 illustrates the pixel MXP in the variation region VA.

In S515, the CPU 410 calculates a variation evaluation value Var indicating a variation degree around the maximum variation pixel MXP. The variation evaluation value Var is an average value of variation values V of 25 pixels in a region FL2 (FIG. 17) corresponding to 5×5 pixels and centered at the maximum variation pixel MXP.

In S520 to S540, the CPU 410 compares the calculated variation evaluation value Var and first and second variation threshold values Vth1 and Vth2 and determines the size of the reference region SP. A magnitude relationship between the first and second variation threshold values Vth1 and Vth2 is Vth1<Vth2.

In S520, the CPU 410 determines whether or not the variation evaluation value Var is smaller than the first variation threshold value Vth1. When the variation evaluation value Var is smaller than the first variation threshold value Vth1 (S520: YES), in S540 the CPU 410 determines a large-size region SPL as the reference region SP. FIG. 17 shows an example of a large-size reference region SPL. A length of the large-size reference region SPL in the horizontal direction is 5 pixels, and a length of the large-size reference region SPL in the vertical direction is about ¾ of the length of the right-side scan image 20R in the vertical direction.

When the variation evaluation value Var is larger than or equal to the first variation threshold value Vth1 (S520: NO), in S525 the CPU 410 determines whether or not the variation evaluation value Var is smaller than the second variation threshold value Vth2. When the variation evaluation value Var is smaller than the second variation threshold value Vth2 (S525: YES), in S535 the CPU 410 determines a middle-size region SPM as the reference region SP. The middle-size region SPM is smaller than the large-size reference region SPL. FIG. 17 shows an example of a middle-size reference region SPM. A length of the middle-size reference region SPM in the horizontal direction is 3 pixels, and a length of the middle-size reference region SPM in the vertical direction is about ½ of the length of the right-side scan image 20R in the vertical direction.

When the variation evaluation value Var is larger than or equal to the second variation threshold value Vth2 (S525: NO), in S530 the CPU 410 determines a small-size region SPS as the reference region SP. The small-size region SPS is smaller than the middle-size region SPM. FIG. 17 shows an example of a small-size reference region SPS. A length of the small-size reference region SPS in the horizontal direction is 1 pixel, and a length of the small-size reference region SPS in the vertical direction is about ¼ of the length of the right-side scan image 20R in the vertical direction.

As shown in FIG. 17, each of the reference regions SPL, SPM, and SPS are disposed with the maximum variation pixel MXP positioned at a center thereof.

According to the configuration of the third embodiment, the size of the reference region SP is determined on a basis of a variation in pixel value among the plurality of pixels in the right-side scan image 20R (S520 to S550 of FIG. 16). As a result, the size of the reference region SP can be properly determined on the basis of a variation in pixel value among the pixels in the right-side scan image 20R, for example. Thus, the corresponding region CP corresponding to the reference region SP can be appropriately determined, whereby the right-side scan image 20R and the left-side scan image 20L is combined properly.

Specifically, the smaller the variation in value among the pixels in the right-side scan image 20R, the larger the size of the reference region SP becomes. That is, the smaller the variation in pixel value among the pixels in the variation region VA defined by the adjacent variation unit region group, the larger the size of the reference region SP becomes. When the variation in pixel value among the pixels in the reference region SP is small, accuracy of determining a position at which the right-side scan image 20R and the left-side scan image 20L are combined may be lowered. Even when the variation in pixel value among the pixels in the right-side scan image 20R is small, the configuration of the embodiment can improve the combination accuracy of determining the position at which the right-side scan image 20R and the left-side scan image 20L are combined by increasing the size of the reference region SP.

Among the plurality of pixels in the variation region VA, a specific pixel (specifically, the maximum variation pixel MXP) having a largest difference in pixel value from its surrounding pixels is specified (S510 of FIG. 16). Then, the size of the reference region SP is determined on the basis of the variation (specifically, variation evaluation value Var) in pixel value among the pixels in a specific range (specifically, in a range corresponding to 5×5 pixels centered at the maximum variation pixel MXP as shown in FIG. 17) (S520 to S540 of FIG. 16). The reference region SP is determined to be the region that is centered at the specified pixel and has the determined size. As a result, the reference region SP having an proper size is positioned, thereby improving accuracy (combination accuracy) when determining the position at which the right-side scan image 20R and the left-side scan image 20L are combined.

D. Modification

While the invention has been described in detail with reference to the embodiments thereof, it would be apparent to those skilled in the art that various changes and modifications may be made therein without departing from the scope of the invention.

(1) In the first embodiment, the CPU 410 may determine, as the reference region SP, a region where a portion having a specific color (for example, white) is comparatively small over a region where a portion having the specific color is comparatively large.

In the reference region determination process (FIG. 6) of the first embodiment, the CPU 410 determines, as the reference region SP, the region corresponding to the partial image having the maximum variation pixel number VC among the variation pixel numbers VC of the plurality of partial images in the arrangement region SA1. However, in this modification (1), the CPU 410 selects one or more partial images where the variation pixel number VC is larger than or equal to a prescribed threshold value, for example. Then, the CPU 410 calculates the number of pixels each having a specific color for each of selected one or more partial images. Subsequently, among the selected one or more partial images, the CPU 410 specifies a partial image where the number of pixels each having the specified color is minimum and then determines a region corresponding to the specified partial image as the reference region SP. The pixel having the specified color is a pixel whose pixel values (R, 0, B) satisfy all the following conditions: 245≤R, 245≤G, and 245≤B.

The portion having a specific color (for example, white) that can be included in the reference region may lower the accuracy of determining the combination position between the right-side scan image 20R and the left-side scan image 20L. For example, the portion having the white color may often be a background and may be highly likely to lack in characteristics. When such a portion is determined as the reference region SP, the corresponding region CP is difficult to be determined with high accuracy. In this modification (1), a region where the portion having a specific color is comparatively small is preferentially determined as the reference region SP, so that the accuracy of determining the combination position between the right-side scan image 20R and the left-sight scan image 20L can be improved.

The specific color is not limited to white, but may be light yellow for example. The light yellow is a color in which a difference in color value is visually inconspicuous. Then, the difference in color value of light yellow may not represent characteristics of the partial image. Thus, when the portion having the light yellow is determined as the reference region SP, the corresponding region CP is difficult to be determined with high accuracy.

(2) In the third embodiment, the large-size, middle-size, and small-size reference regions SPL, SPM, and SPS are disposed at a position centered at the maximum variation pixel MXP in the variation region VA. Alternatively, the reference regions SPL, SPM, and SPS may be disposed at any position that overlaps with at least part of the variation region VA.

(3) Any configurations in the above embodiments may be combined arbitrary. For example, after the reference region SP is determined by the reference region determination process (FIG. 6) of the first embodiment, the size of the determined reference region SP may be adjusted using the method of the third embodiment. For example, the CPU 410 may specify the maximum variation pixel MXP from among the pixels included in the reference region SP determined by the reference region determination process of the first embodiment. Subsequently, the CPU 410 executes the processes S515 to S540 of FIG. 16 for adjusting (modifying) the size of the reference region SP.

(4) In the above embodiments, two sets of scan data are used to generate combined image data representing an image obtained by combining two scan images. Alternatively, arbitrary number of sets of scan data may be used to generate the combined image data. For example, four sets of scan data may be used to generate combined image data representing an image obtained by combining four scan images.

(5) In the reference region determination process (FIG. 6) of the first embodiment, the variation pixel number VC is used as a value representing a variation in pixel value among the plurality of pixels in the partial image (S120 of FIG. 6). Alternatively, as the value representing a variation in pixel value among the plurality of pixels in the partial image, a variance $\sigma^2$, a standard deviation a, or an edge amount of the pixel values of the plurality of pixels in the partial image may be used, for example. The same is applied to the value representing a variation in pixel value among the plurality of pixels in the unit region in the reference region determination process (FIG. 12) of the second embodiment (variation pixel number VCu in S320).

(6) The variation region VA (FIG. 13C and FIG. 17) specified in the second and third embodiments is not necessarily one region composed of a plurality of continuous pixels but may be a plurality of regions separated from one another.

(7) In the corresponding region determination process (FIG. 9) of each of the above embodiments, an algorithm for determining the corresponding region CP corresponding to the reference region SP is an example, and another algorithm may be used. For example, the CPU 410 may calculate a value VPtotal on the basis of the difference ΔVP. Specifically, the CPU 410 may calculate the difference ΔVP between pixel values of each of reference pixels in the reference region SP and pixel values of each of pixels in the target candidate region corresponding to the reference pixel, and obtain the value VPtotal by summing the differences ΔVP with respect to all the reference pixels in the reference region SP. Then, the CPU 410 may determine, as the corresponding region CP, a candidate region where the VPtotal is minimum among the plurality of candidate regions that can be disposed in the search region SA2. In any case, the reference region SP in the right-side scan image 20R and each of the plurality of candidate regions in the left-side scan image 20L are the same in size and shape.

(8) In the above embodiments, the two sets of image data to be used for generation of the combined image data are two sets of scan data generated by the scanner section 250 of the multifunction peripheral 200 by reading a document. Alternatively, the two sets of image data may be generated by a digital camera. That is, the digital camera takes images of a plurality of regions (two regions, for example) in a document for generating the plurality of sets of image data (two sets of image data, for example).

(9) The processes (processes S25 to S40 of FIG. 2) executed by the CPU 410 of the server 400 in the above embodiments may be executed by the CPU 210 of the multifunction peripheral 200, for example. In this case, the server 400 need not be provided, and the multifunction peripheral 200 may execute the processes of FIG. 2 by itself.

Further, the processes executed by the CPU 410 of the server 400 may be executed by a CPU (not illustrated) of the personal computer 500 (FIG. 1) connected to the multifunction peripheral 200. For example, the CPU of the personal computer 500 may execute a scanner driver program installed in the personal computer 500 so as to execute the processes of FIG. 2. Further, the server 400 may only have a single computer as in the above embodiments or have a computation system including a plurality of computers.

(10) Part of the configuration of the invention implemented in hardware in the embodiments described above may be replaced by software and, conversely, part of the configuration of the invention implemented in software may be replaced by hardware.

What is claimed is:

1. An image processing apparatus comprising:
   a processor comprising hardware; and
   a memory storing computer-readable instructions therein, the computer-readable instructions, when executed by the processor, causing the image processing apparatus to perform:
   acquiring a first scan image data representing a first scan image having a plurality of pixels and a second scan image data representing a second scan image, each of the plurality of pixels having a pixel value, the first scan image data being acquired by scanning a first part of a specific document, the second scan image data being acquired by scanning a second part of the specific document;
   determining a reference region that is a part region of the first scan image;
   calculating, for each of at least one of candidate regions among a plurality of candidate regions in the second scan image, a degree of similarity between the reference region and the each of at least one candidate regions;
   identifying a corresponding region from among the plurality of candidate regions based on at least one degree of similarity; and
   generating combined image data by using the first scan image data and the second scan image data, the combined image data representing a combined image in which the first scan image is combined with the second scan image by overlapping the reference region with the identified corresponding region,
   wherein a size of the reference region is determined based on a variation in the pixel value among the plurality of pixels in the first scan image data,
   wherein the determining the reference region further includes:
      setting a plurality of unit regions in the first scan image;
      calculating a variation value indicating a variation in the pixel value among pixels in each of the plurality of unit regions; and
      selecting at least one unit region among the plurality of unit regions, each of the at least one unit region having a variation value larger than a threshold value,
      wherein the reference region is determined based on the selected at least one unit region.

2. The image processing apparatus according to claim 1, wherein the smaller the variation is, the larger the size of the reference region is determined.

3. The image processing apparatus according to claim 1, wherein a position of the reference region is determined based on the variation.

4. The image processing apparatus according to claim 1, wherein the computer-readable instructions causes the image processing apparatus to further perform:
   calculating a variation value indicating a variation in the pixel value among pixels in each of a plurality of partial images included in the first scan image;
   wherein one of the plurality of the partial images having a largest variation value is determined to be the reference region.

5. The image processing apparatus according to claim 1, wherein the determining the reference region determines a shape of the reference region based on the variation in the pixel value among the plurality of pixels in the first scan image data.

6. An image processing apparatus comprising:
   a processor comprising hardware; and
   a memory storing computer-readable instructions therein, the computer-readable instructions, when executed by the processor, causing the image processing apparatus to perform:
   acquiring a first scan image data representing a first scan image having a plurality of pixels and a second scan image data representing a second scan image, each of the plurality of pixels having a pixel value, the first scan image data being acquired by scanning a first part of a specific document, the second scan image data being acquired by scanning a second part of the specific document;
   determining a reference region that is a part region of the first scan image;
   calculating, for each of at least one of candidate regions among a plurality of candidate regions in the second scan image, a degree of similarity between the reference region and the each of at least one candidate regions;
   identifying a corresponding region from among the plurality of candidate regions based on at least one degree of similarity; and
   generating combined image data by using the first scan image data and the second scan image data, the combined image data representing a combined image in which the first scan image is combined with the second scan image by overlapping the reference region with the identified corresponding region,
   wherein a size of the reference region is determined based on a variation in the pixel value among the plurality of pixels in the first scan image data;
   wherein the first scan image has a first region and a second region, wherein a part of the first region having a specific color is smaller than a part of the second region having the specific color,
   wherein the determining the reference region preferentially determines, as the reference region, the first region over the second region.

7. The image processing apparatus according to claim 1, wherein the determining the reference region determines at least one of a shape of the reference region, a size of the reference region, and a position of the reference region based on the selected at least one unit region.

8. The image processing apparatus according to claim 1, wherein the reference region is determined so as to encompass the selected at least one unit region.

9. The image processing apparatus according to claim 1, wherein the reference region is determined such that the selected at least unit region encompasses the reference region.

10. The image processing apparatus according to claim 1, wherein the reference region is determined such that the selected at least one unit region encompasses the reference region when a size of the selected at least one unit region is larger than or equal to a reference size,
wherein the reference region is determined so as to encompass the selected at least one unit region when a size of the selected at least one unit region is smaller than the reference size.

11. The image processing apparatus according to claim 1, wherein the smaller the variation in the pixel value in the selected at least one unit region is, the larger size the reference region has.

12. The image processing apparatus according to claim 11, wherein the selected at least one unit region includes unit-region pixels,
wherein the determining the reference region includes:
calculating a difference value indicating a difference between a pixel value of each of the unit-region pixels and a pixel value of at least one pixel surrounding the each of the unit-region pixels; and
selecting a specific pixel having a maximum difference value among the calculated difference values,
wherein a size of the reference region is determined based on a variation in the pixel value among pixels within a prescribed range from the specific pixel,
wherein the reference region is determined such that the reference region has the determined size and the specific pixel is positioned at a center of the reference region.

13. The image processing apparatus according to claim 1, wherein the determining the reference region further includes classifying each of the plurality of unit regions into one of a first type and a second type, classification into the first type being made when the variation value of the unit region is larger than or equal to the threshold value, classification into the second type being made when the variation value of the unit region is smaller than the threshold value,
wherein the determining the reference region selects, as the at least unit region, unit regions that are adjacent to each other and are classified into the first type.

14. The image processing apparatus according to claim 13, wherein the determining the reference region further includes specifying a dense region in which unit regions classified into the first type are most densely located in the first scan image,
wherein the selected at least unit regions includes at least one unit region located in the dense region.

15. The image processing apparatus according to claim 1, wherein the reference region has a same size and shape of the corresponding region.

16. An image processing apparatus comprising:
a processor comprising hardware; and
a memory storing computer-readable instructions therein, the computer-readable instructions, when executed by the processor, causing the image processing apparatus to perform:
acquiring a first scan image data representing a first scan image having pixels and a second scan image data representing a second scan image, the first scan image data having pixel values corresponding to the pixels, the first scan image data being acquired by scanning a first part of a specific document, the second scan image data being acquired by scanning a second part of the specific document;
determining a reference region that is a part region of the first scan image;
calculating, for each of at least one candidate region among a plurality of candidate regions in the second scan image, a degree of similarity between the reference region and the each of at least one candidate region;
identifying a corresponding region from among the plurality of candidate regions based on at least one degree of similarity; and
generating combined image data by using the first scan image data and the second scan image data, the combined image data representing a combined image in which the first scan image is combined with the second scan image by overlapping the reference region with the identified corresponding region,
wherein the determining the reference region includes:
calculating a variation value indicating a variation in the pixel value among pixels in each of a plurality of partial images from the first scan image,
wherein the reference region is determined to be a partial image that has a largest variation value from among the plurality of partial images;
wherein the determining the reference region further includes:
setting a plurality of unit regions in the first scan image;
calculating a variation value indicating a variation in the pixel value among pixels in each of the plurality of unit regions; and
selecting at least one unit region among the plurality of unit regions, each of the at least one unit region having a variation value larger than a threshold value,
wherein the reference region is determined based on the selected at least one unit region.

17. An image processing apparatus comprising:
a processor comprising hardware; and
a memory storing computer-readable instructions therein, the computer-readable instructions, when executed by the processor, causing the image processing apparatus to perform:
acquiring a first scan image data representing a first scan image having pixels and a second scan image data representing a second scan image, the first scan image data having pixel values corresponding to the pixels, the first scan image data being acquired by scanning a first part of a specific document, the second scan image data being acquired by scanning a second part of the specific document;
determining a reference region that is a part region of the first scan image;
calculating, for each of at least one of candidate region among a plurality of candidate regions in the second scan image, a degree of similarity between the reference region and the each of at least one candidate regions;
identifying a corresponding region from among the plurality of candidate regions based on at least one degree of similarity; and
generating combined image data by using the first scan image data and the second scan image data, the combined image data representing a combined image in which the first scan image is combined with the second scan image by overlapping the reference region with the identified corresponding region,
wherein a shape of the reference region is determined based on a variation in the pixel value among the plurality of pixels in the first scan image data;

wherein the determining the reference region further includes:
  setting a plurality of unit regions in the first scan image;
  calculating a variation value indicating a variation in the pixel value among pixels in each of the plurality of unit regions; and
  selecting at least one unit region among the plurality of unit regions, each of the at least one unit region having a variation value larger than a threshold value,
  wherein the reference region is determined based on the selected at least one unit region.

18. An image processing apparatus comprising:
a processor comprising hardware; and
a memory storing computer-readable instructions therein, the computer-readable instructions, when executed by the processor, causing the image processing apparatus to perform:
  acquiring a first scan image data representing a first scan image having pixels and a second scan image data representing a second scan image, the first scan image data having pixel values corresponding to the pixels, the first scan image data being acquired by scanning a first part of a specific document, the second scan image data being acquired by scanning a second part of the specific document;
  determining a first reference region that is a part region of the first scan image;
  determining a second reference region within the first image by modifying number of pixels in the first reference region;
  calculating, for each of at least one of candidate region among a plurality of candidate regions in the second scan image, a degree of similarity between the second reference region and the each of at least one candidate regions;
  identifying a corresponding region from among the plurality of candidate regions based on at least one degree of similarity; and
  generating combined image data by using the first scan image data and the second scan image data, the combined image data representing a combined image in which the first scan image is combined with the second scan image by overlapping the second reference region with the identified corresponding region;
  wherein the determining the first reference region further includes:
    setting a plurality of unit regions in the first scan image;
    calculating a variation value indicating a variation in the pixel value among pixels in each of the plurality of unit regions; and
    selecting at least one unit region among the plurality of unit regions, each of the at least one unit region having a variation value larger than a threshold value,
    wherein the first reference region is determined based on the selected at least one unit region.

* * * * *